(12) United States Patent
Kataoka et al.

(10) Patent No.: US 8,074,245 B2
(45) Date of Patent: Dec. 6, 2011

(54) PROGRAM RESERVATION SYSTEM AND PROGRAM RESERVING METHOD

(75) Inventors: Mitsuteru Kataoka, Osaka (JP); Yasushi Yoneda, Osaka (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 12/446,501

(22) PCT Filed: Nov. 2, 2007

(86) PCT No.: PCT/JP2007/071422
§ 371 (c)(1),
(2), (4) Date: Apr. 21, 2009

(87) PCT Pub. No.: WO2008/053996
PCT Pub. Date: May 8, 2008

(65) Prior Publication Data
US 2010/0186047 A1 Jul. 22, 2010

(30) Foreign Application Priority Data
Nov. 2, 2006 (JP) .................................. 2006-298632

(51) Int. Cl.
*H04N 5/445* (2011.01)
*H04N 7/16* (2011.01)
(52) U.S. Cl. .............. 725/58; 725/39; 725/61; 725/151; 725/153
(58) Field of Classification Search .................... 725/39, 725/58, 61, 151–153; 386/83
See application file for complete search history.

(56) References Cited

U.S. PATENT DOCUMENTS

| | | | |
|---|---|---|---|
| 6,513,064 B1 | 1/2003 | Horiguchi et al. | |
| 6,549,929 B1 | 4/2003 | Sullivan | |
| 6,810,199 B1 | 10/2004 | Horiguchi et al. | |
| 7,082,254 B1 | 7/2006 | Rashkovskiy et al. | |
| 2003/0198461 A1 | 10/2003 | Taylor et al. | |
| 2003/0208763 A1* | 11/2003 | McElhatten et al. | 725/58 |
| 2003/0220100 A1* | 11/2003 | McElhatten et al. | 455/418 |
| 2005/0204388 A1 | 9/2005 | Knudson et al. | |

(Continued)

FOREIGN PATENT DOCUMENTS

EP 95/06390 3/1995

(Continued)

OTHER PUBLICATIONS

English language Abstract and translation JP 2005-175850 A.

(Continued)

*Primary Examiner* — Kieu Oanh T Bui
(74) *Attorney, Agent, or Firm* — Greenblum & Bernstein, P.L.C.

(57) ABSTRACT

In a receiving device, a receiver receives extended program information. A user selects a program to be reserved by a selection operation using an operation input unit. An extended reservation manager causes an instruction receiver to transmit an extended reservation instruction based on an extended program identifier for identifying the selected program. In a recording device, a receiver receives program data, mapping information, and program information. The instruction receiver receives the extended reservation instruction transmitted from the receiver. An extended reservation executor acquires an extended program identifier from the received extended reservation instruction and acquires a program identifier corresponding to the extended program identifier on the basis of the mapping information, to store a program reservation on the basis of the program identifier. A program recorder/reproducer records and/or reproduces the program data in accordance with the stored program reservation. The extended reservation instruction is configured so as not to be recognized as a reservation instruction by a recording/reproducing appliance that is not adapted to the extended program information.

14 Claims, 18 Drawing Sheets

U.S. PATENT DOCUMENTS

| | | |
|---|---|---|
| 2005/0276574 A1 | 12/2005 | Kaneko et al. |
| 2006/0024028 A1 | 2/2006 | Kato |
| 2006/0248561 A1 | 11/2006 | Hashimoto et al. |
| 2007/0094689 A1* | 4/2007 | McElhatten et al. ............ 725/58 |
| 2007/0157209 A1 | 7/2007 | Hashimoto et al. |
| 2008/0008444 A1 | 1/2008 | Hori |
| 2008/0271075 A1 | 10/2008 | Kawai |

FOREIGN PATENT DOCUMENTS

| | | |
|---|---|---|
| EP | 0987892 | 3/2000 |
| EP | 1058454 | 12/2000 |
| EP | 1675400 | 6/2006 |
| EP | 1768393 A1 | 3/2007 |
| JP | 2000-316133 A | 11/2000 |
| JP | 2003-333451 A | 11/2003 |
| JP | 2005-175850 A | 6/2005 |
| JP | 2005-328218 A | 11/2005 |
| WO | 2005/117422 A1 | 12/2005 |
| WO | 2006/043484 | 4/2006 |

OTHER PUBLICATIONS

Wilson E J, "Programme Delivery Control for Simplified Home Video Recording", IEEE Transactions on Consumer Electronics, IEEE Service Center, New York, NY, US, vol. 37, No. 4, XP000275983, Nov. 1, 1991, pp. 737-745.

Green N W, "PDC (Programme Delivery Control)", Image Technology, Bksts, London, GB, vol. 76, No. 6, XP000444744, Jul. 1, 1994, pp. 122-124.

"Television systems; Specification of the domestic video Programme Delivery Control system (PDC); ETSI EN 300 231", ETSI Standards, Lis, Sophia Antipolis Cedex, France, vol. BC, No. V1.3.1, XP014000897, Apr. 1, 2003.

* cited by examiner

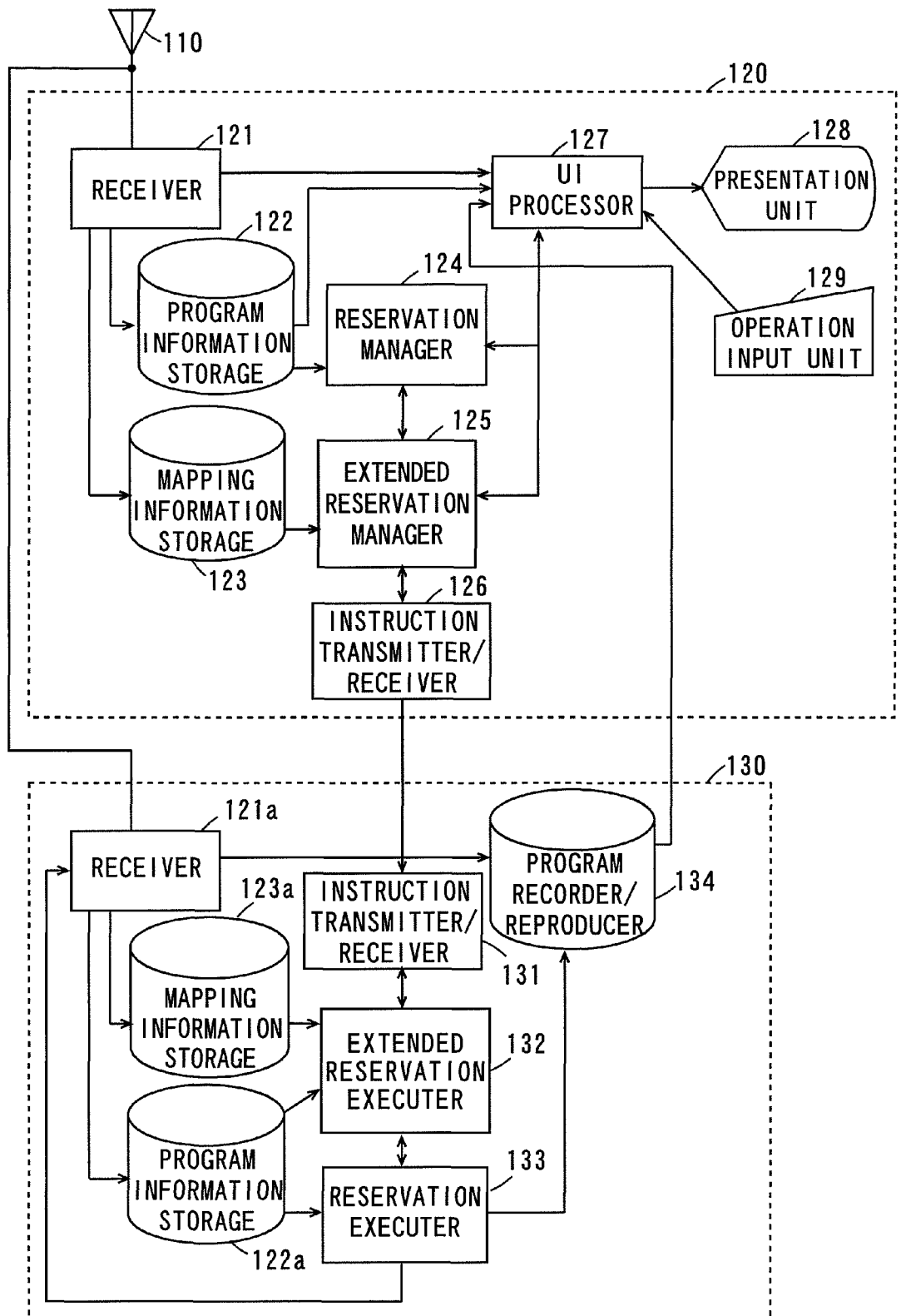
F I G. 1

| BROADCASTING DATE | BROADCASTING STATION | EXTENDED PROGRAM IDENTIFIER | PROGRAM TITLE |
|---|---|---|---|
| 2006/5/1 20:00~21:50 | XYZ-TV | 0x4021 | XYZ SPECIAL |
| 2006/6/21 23:00~23:58 | TV-FUN | 0x4101 | BLOGSPIDERS LIVE |
| : | : | : | : |
| 2006/8/6 21:00~22:30 | MYMY-TV | 0x52a0 | SPACE JOURNEY SPECIAL |

215

(b) 220

| BROADCASTING DATE | BROADCASTING STATION | EXTENDED PROGRAM IDENTIFIER | PROGRAM IDENTIFIER |
|---|---|---|---|
| 2006/5/1 20:00~21:50 | XYZ-TV | 0x4021 | 0x1002a102 |

225

(c) 230

| BROADCASTING DATE | BROADCASTING STATION | PROGRAM IDENTIFIER | PROGRAM TITLE |
|---|---|---|---|
| : | : | : | : |
| 2006/5/2 19:00~21:00 | XYZ-TV | 0x1002a101 | TODAY SPORT |
| 2006/5/2 21:00~22:50 | XYZ-TV | 0x1002a102 | XYZ SPECIAL 2006 |
| 2006/5/2 22:50~23:10 | XYZ-TV | 0x1002a103 | NEWS XYZ |
| : | : | : | : |

| | BROADCASTING STATION 611 | DATE 612 | PROGRAM TITLE 613 | STATE 614 | |
|---|---|---|---|---|---|
| 631 | 2ch | 2007/4/1 10:00-11:00 | NEWS 10 | RECEIVE IN ADVANCE | TRANSMITTED |
| 632 | 4ch | 2007/4/8 20:00-21:00 | DRAMA 123 | RECEIVE IN ADVANCE | BROADCASTING SUSPENDED |
| 633 | 6ch | 2007/4/16 21:00-22:00 | MUSIC X PART1 | RECEIVE IN ADVANCE | SPLIT(1/2) |
| 634 | 6ch | 2007/4/16 22:00-23:30 | MUSIC X PART2 | RECEIVE IN ADVANCE | SPLIT(2/2) |
| 635 | 2ch | 2007/4/17 19:00-19:30 | POWER COOKING | RECEIVE IN ADVANCE | BEING RETRIEVED |
| | | | | | |

610

F I G. 1 2
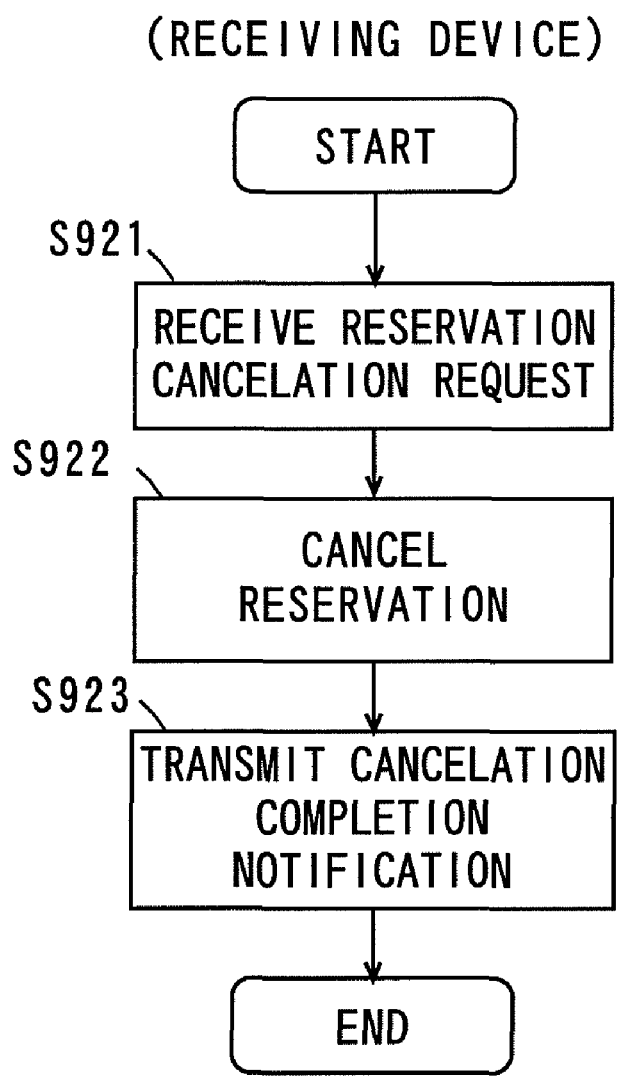

FIG. 18
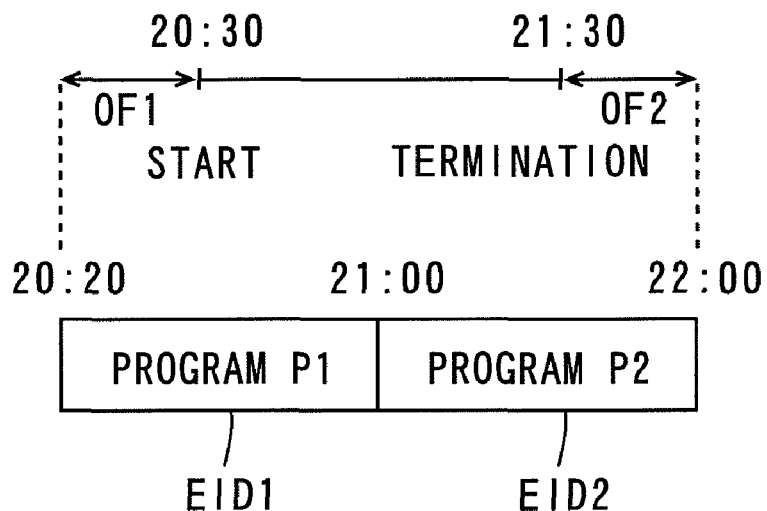
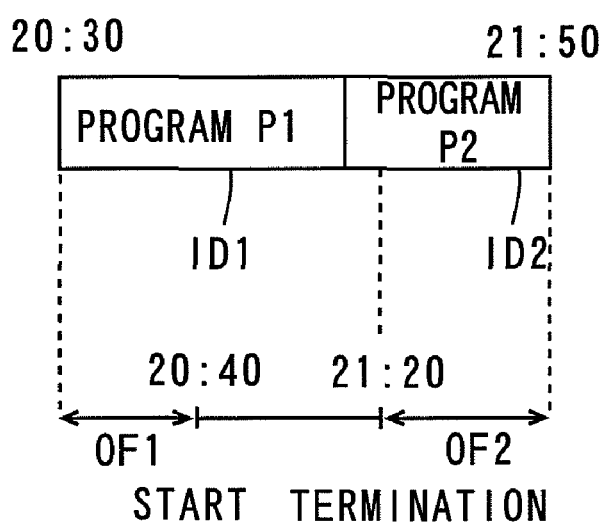

PROGRAM RESERVATION SYSTEM AND PROGRAM RESERVING METHOD

TECHNICAL FIELD

The present invention relates to a method and a system for selecting recording or reproduction of a program transmitted by broadcasting or communication from programming information transmitted by broadcasting or communication to reserve the recording or reproduction.

BACKGROUND ART

In conventional program reserving methods and program reservation systems, recording or reproduction is reserved using programming information transmitted by broadcasting.

Programming information is information composed of a plurality of program information. The program information is information relating to each program, and includes at least a broadcasting station and a broadcasting date. The program information may, in some cases, include information used for a user selecting or retrieving a program in addition thereto. Examples of the information include the title of the program, the genre of the program, a descriptive text of the program, performers, and link information to related information. A display window for an EPG (Electric Program Guide) can be configured by displaying the programming information on a screen. The programming information may, in some cases, be referred to as EPG data. Furthermore, programming information until after a predetermined time period, for example, eight days from today is transmitted. A user can display a program listing until after a predetermined time period. The user can select a program which he/she wants to view from the program listing and register a reservation of the program. This allows the program whose reservation has been registered to be recorded on a recording appliance.

Program information includes a date on which a program is broadcast, a broadcasting station at which the program is broadcast, a program identifier for identifying the program, and the title of the program, for example.

The program identifier has a value unique to programming information transmitted at least a certain time. If the program identifier is designated, program information relating to the program can be referred to by referring to the programming information at that time point. The program identifier is "event_id" prescribed in ARIB (Association of Radio Industries and Businesses) STD-B10 that is a digital broadcasting standard in Japan, for example. Since "event_id" is stored in a 16-bit field, a maximum of 65536 programs per broadcasting station can be distinguished by "event_id". Since a range of value that can be taken by "event_id" is finite, a value that can be used once is utilized again after a sufficient time period. Furthermore, "event_id" is automatically assigned to the program by a broadcasting transmission system at the broadcasting station. For example, a finally assigned value plus one is assigned to the subsequent program.

Description is herein made of a normal reservation operation performed in a program reservation system including a receiving device and a recording device.

The receiving device stores programming information. First, a user instructs the receiving device to display a program listing. Thus, the receiving device displays the program listing on the basis of the stored programming information.

Then, the user selects a program which he/she wants to reserve from the program listing. The receiving device generates information relating to a date on which and a broadcasting station at which the selected program starts to be broadcast as a reservation entry. Furthermore, the receiving device generates a reservation instruction corresponding to the reservation entry, and transmits the reservation instruction to the recording device.

Then, the recording device stores, when it receives the reservation instruction from the receiving device, information included in the reservation instruction as a reservation entry. The reservation entry includes a broadcasting date on which and a broadcasting station at which the program is broadcast. The recording device receives the program broadcast at the broadcasting station included in the reservation entry while starting a recording operation on the broadcasting date included in the reservation entry. This causes a reservation to be executed.

Patent Document 1 discloses a method of reserving future programs after a predetermined time period during which programming information is transmitted. Patent Document 1 assumes that enlarged program information relating to the future program after the predetermined time period is transmitted in addition to the programming information. The extended program information includes an enlarged program identifier for identifying the program.

In this case, in a broadcasting station system, information for establishing a one-to-one correspondence between an extended program identifier and a program identifier at the time point where the program identifier is defined is generated as mapping information and broadcast.

Patent Document 2 discloses an example in which a broadcasting date on which a program is broadcast is undefined at the time point where extended program information is transmitted.

[Patent Document 1] WO 2005/117422 pamphlet
[Patent Document 2] JP 2005-328218 A

DISCLOSURE OF THE INVENTION

Problems to be Solved by the Invention

However, the above-mentioned Patent Documents 1 and 2 do not disclose a specific communication protocol between devices in a case where an instruction to timer-record or timer-reproduce a program is given from a receiving device such as a television receiver to a recording device.

Actually, there are not only a case where a receiving device that is adapted to extended program information and a recording device that is adapted to the extended program information are connected to each other but also a case where a receiving device that is adapted to the extended program information and a recording device that is not adapted to the extended program information are connected to each other and a case where a receiving device that is not adapted to the extended program information and a recording device that is adapted to the extended program information are connected to each other. Furthermore, when a plurality of receiving devices and a plurality of recording devices are connected to each other, the above-mentioned three connection forms may, in some case, be combined.

In such a case, a user must execute a program reservation in different operating methods depending on whether or not each of the receiving device and the recording device is adapted to the extended program information after recognizing whether or not each of the receiving device and the recording device is adapted to the extended program information. This makes it difficult for the user to execute the program reservation using the extended program information or program information reliably and simply.

Means for Solving the Problems

An object of the present invention is to provide a program reservation system and a program reserving method in which a user can execute a program reservation using extended program information or program information reliably and simply without being conscious of whether or not each of a reservation instruction device and a reservation execution device is adapted to the extended program information.

(1) According to an aspect of the present invention, a program reservation system that receives program data transmitted from a broadcasting station, program information including a program identifier for identifying a program, extended program information including an extended program identifier for identifying the program before the program identifier is transmitted, and mapping information representing a correspondence between the extended program identifier and the program identifier includes a reservation instruction device that gives an instruction to reserve a program, and a reservation execution device that executes a reservation based on the instruction given by the reservation instruction device, in which the reservation instruction device includes a first receiver that receives the extended program information, a selector for selecting a program to be reserved on the basis of the extended program information received by the first receiver, and a transmitter that transmits an extended reservation instruction based on an extended program identifier for identifying the program selected by the selector, and the reservation execution device includes a second receiver that receives the program data, the mapping information, the program information, and the extended reservation instruction transmitted from the reservation instruction device, a first acquirer that acquires an extended program identifier from the extended reservation instruction received by the second receiver, a second acquirer that acquires a program identifier corresponding to the extended program identifier acquired by the first acquirer on the basis of the mapping information received by the second receiver, a storage that stores a program reservation on the basis of the program identifier acquired by the second acquirer, and a recorder/reproducer that records and/or reproduces the program data received by the second receiver in accordance with the program reservation stored in the storage.

In the reservation instruction device in this program reservation system, the extended program identifier is received, the program to be reserved is selected on the basis of the received extended program information, and the extended reservation instruction based on the extended program identifier for identifying the selected program is transmitted. In the reservation execution device, the program data, the mapping information, the program information, and the extended reservation instruction transmitted from the reservation instruction device are received, and the extended program identifier is acquired from the received extended reservation instruction. The program identifier corresponding to the acquired extended program identifier is acquired on the basis of the received mapping information, and the program reservation is stored on the basis of the acquired program identifier. The received program data is recorded and/or reproduced in accordance with the stored program reservation.

In such a way, the extended reservation instruction based on the extended program identifier is transmitted from the reservation instruction device to the reservation execution device, and the program information is acquired from the extended reservation instruction using the mapping information in the reservation execution device. This causes the program reservation based on the program identifier to be executed.

Here, a recording/reproducing appliance that is not adapted to the extended program information may, in some cases, be connected to the reservation instruction device. Even in such a case, the extended reservation instruction is configured so as not be recognized as the reservation instruction by the recording/reproducing appliance. In the recording/reproducing appliance that is not adapted to the extended program information, therefore, the program reservation is executed on the basis of a reservation instruction based on the program information.

Therefore, a user can execute the program reservation using the extended program information or the program information reliably and simply without being conscious of whether or not each of the reservation instruction device and the reservation execution device is adapted to the extended program information.

(2) The extended reservation instruction may include a broadcasting station at which and a broadcasting time period during which the program is broadcast while including predetermined information at a position ignored by the recording/reproducing appliance.

In this case, the recording/reproducing appliance that is not adapted to the extended program information ignores the extended program information in the extended reservation instruction while being able to execute the program reservation based on the program identifier on the basis of a broadcasting station and a broadcasting time period in the reservation instruction. On the other hand, the reservation execution device can execute the program reservation based on the extended program information using the predetermined information included at the position ignored by the recording/reproducing appliance that is not adapted to the extended program information.

(3) The extended reservation instruction may include the broadcasting station at which the program is broadcast while having an invalid value as a program identifier.

In this case, the recording/reproducing appliance that is not adapted to the extended program information ignores the extended program information in the extended reservation instruction while being able to execute the program reservation based on the program identifier on the basis of a broadcasting station in the reservation instruction. On the other hand, the reservation execution device can execute the program reservation based on the extended program information using the invalid value as the program identifier.

(4) The extended reservation instruction may have a configuration in which predetermined information is further added to the configuration of the reservation instruction.

In this case, the recording/reproducing appliance that is not adapted to the extended program information ignores the extended program information in the extended reservation instruction while being able to execute the program reservation based on the program identifier on the basis of the reservation instruction. On the other hand, the reservation execution device can execute the program reservation based on the extended program information using the predetermined information added to the configuration of the reservation instruction.

(5) According to another aspect of the present invention, a program reservation system that receives program data transmitted from a broadcasting station, program information including a program identifier for identifying a program, extended program information including an extended program identifier for identifying the program before the program identifier is transmitted, and mapping information representing a correspondence between the extended program identifier and the program identifier includes a reservation instruction device that gives an instruction to reserve a program, and a reservation execution device that executes a reservation based on the instruction given by the reservation instruction device, in which the reservation instruction device includes a first receiver that receives the extended program identifier information, the program information, and the mapping information, a selector for selecting a program to be reserved on the basis of the extended program information received by the first receiver, and an acquirer that acquires a program identifier corresponding to the extended program identifier for identifying the program selected by the selector on the basis of the mapping information received by the first receiver, a transmitter that transmits a reservation instruction based on the program identifier acquired by the acquirer, and a presentation unit that presents situations where the program identifier based on the mapping information is acquired for the reservation of the program selected by the selector, and the reservation execution device includes a second receiver that receives the program data and the reservation instruction transmitted from the reservation instruction device, a storage that stores a program reservation on the basis of the reservation instruction received by the second receiver, and a recorder/reproducer that records and/or reproduces the program data received by the second receiver in accordance with the program reservation stored in the storage.

In the reservation instruction device in this program reservation system, the extended program information, the program information, and the mapping information are received, and the program to be reserved is selected on the basis of the received extended program information. The program identifier corresponding to the extended program identifier for identifying the selected program is acquired on the basis of the received mapping information, and the reservation instruction based on the acquired program identifier is transmitted. Furthermore, the situations where the program identifier based on the mapping information is acquired are presented for the reservation of the selected program. In the reservation execution device, the program data and the reservation instruction transmitted from the reservation instruction device are received, and the program reservation is stored on the basis of the received reservation instruction. The program data received in accordance with the stored program reservation is recorded and/or reproduced.

In such a way, the program identifier is acquired using the mapping information from the extended program information in the reservation instruction device, and the reservation instruction based on the program identifier is transmitted from the reservation instruction device to the reservation execution device. This causes the program reservation based on the program identifier to be executed.

Here, a recording/reproducing appliance that is not adapted to the extended program information may, in some cases, be connected to the reservation instruction device. Even in such a case, the reservation instruction based on the program identifier is transmitted to the recording/reproducing appliance. In the recording/reproducing appliance that is not adapted to the extended program information, therefore, the program reservation is executed on the basis of a reservation instruction based on the program information.

Furthermore, in the reservation instruction device, the situations where the program identifier based on the mapping information is acquired are presented for the reservation of the selected program. This allows a user to easily recognize whether or not the program reservation based on the newest schedule for broadcasting is completed.

Therefore, the user can execute the program reservation using the extended program information or the program information reliably and simply without being conscious of whether or not each of the reservation instruction device and the reservation execution device is adapted to the extended program information.

(6) The situations where the program identifier based on the mapping information is acquired may include a state where the acquisition of the program identifier based on the mapping information is waited for.

In this case, the user can easily recognize that the reservation instruction device waits for the acquisition of the program identifier based on the mapping information.

(7) The transmitter may transmit the reservation instruction after an elapse of not less than a predetermined time period since the acquirer acquired the program identifier.

Here, when the acquirer in the reservation instruction device acquires the program identifier, the reservation execution device may, in some cases, be unable to receive the reservation instruction. Even in such a case, the reservation instruction device transmits the reservation instruction after an elapse of a predetermined time period, so that the reservation execution device can reliably receive the reservation instruction.

(8) According to still another aspect of the present invention, a program reservation system that receives program data transmitted from a broadcasting station, program information including a program identifier for identifying a program, extended program information including an extended program identifier for identifying the program before the program identifier is transmitted, and mapping information representing a correspondence between the extended program identifier and the program identifier includes a reservation instruction device that gives an instruction to reserve a program, and a reservation execution device that executes a reservation based on the instruction given by the reservation instruction device, in which the reservation instruction device includes a first receiver that receives the extended program information, the program information, and the mapping information, a selector for selecting a program to be reserved on the basis of the extended program information received by the first receiver, and a first acquirer that acquires a program identifier corresponding to the extended program identifier for identifying the program selected by the selector on the basis of the mapping information received by the first receiver, and a transmitter that transmits an extended reservation instruction based on the extended program identifier in order to reserve the program selected by the selector, and then transmits a reservation instruction based on the program identifier acquired by the first acquirer, and the reservation execution device includes a second receiver that receives the program data and the extended reservation instruction and the reservation instruction that are transmitted from the reservation instruction device, a second acquirer that acquires the extended program identifier on the basis of the extended reservation instruction received by the second receiver and acquires the program identifier on the basis of the reservation instruction received by the second receiver, a storage that stores as a provisional reservation a program reservation based on the extended program identifier acquired by the second acquirer when the second receiver receives the extended reservation instruction, and stores a program reservation based on the program identifier acquired by the second acquirer when the second receiver receives the reservation instruction, a recorder/reproducer that records and/or reproduces the program data received by the second receiver in accordance with the program reservation stored in the storage, and a presentation unit that makes a presentation as to whether or not the program reservation stored in the storage is the provisional reservation.

In the reservation instruction device in this program reservation system, the extended program information, the program information, and the mapping information are received, the program to be reserved is selected on the basis of the received extended program information, and the program identifier corresponding to the extended program identifier for identifying the selected program is acquired on the basis of the received mapping information. After the extended reservation instruction based on the extended program identifier is transmitted in order to reserve the selected program, the reservation instruction based on the acquired program identifier is transmitted. In the reservation execution device, the program data and the extended reservation instruction and the reservation instruction that are transmitted from the reservation instruction device are received, the extended program identifier is acquired on the basis of the received extended reservation instruction, and the program identifier is acquired on the basis of the reservation instruction. The program reservation based on the extended program identifier acquired when the extended reservation instruction is received is stored as the provisional reservation, and the program reservation based on the program identifier acquired when the reservation instruction is received is stored. The program data received in accordance with the stored program reservation is recorded and/or reproduced. Furthermore, the presentation is made as to whether or not the stored program reservation is the provisional reservation.

In such a way, the program identifier is acquired using the mapping information from the extended program information in the reservation instruction device, the extended reservation instruction based on the extended program identifier is transmitted as the provisional reservation from the reservation instruction device to the reservation execution device, and the reservation instruction based on the program identifier is then transmitted. This causes the program reservation based on the program identifier to be executed after the provisional program reservation based on the extended program identifier.

Here, a recording/reproducing appliance that is not adapted to the extended program information may, in some cases, be connected to the reservation instruction device. Even in such a case, the reservation instruction based on the program identifier is transmitted to the recording/reproducing appliance. In the recording/reproducing appliance that is not adapted to the extended program information, therefore, the program reservation is executed on the basis of the reservation instruction based on the program information.

Furthermore, the presentation is made as to whether or not the stored program reservation is the provisional reservation in the reservation execution device. This allows a user to easily recognize whether or not the program reservation based on the newest schedule for broadcasting is completed.

Therefore, the user can execute the program reservation using the extended program information or the program information reliably and simply without being conscious of whether or not each of the reservation instruction device and the reservation execution device is adapted to the extended program information.

(9) The storage may write the program reservation based on the program identifier over the program reservation based on the extended program identifier when the second receiver receives the reservation instruction.

When a schedule for broadcasting of the program is changed, therefore, the program reservation before the change is automatically updated to a program reservation after the change.

(10) The reservation execution device may further include a canceller that selects a program to be canceled and cancels a program reservation corresponding to the selected program from the storage while transmitting a request to cancel the selected program to the reservation instruction device.

In this case, when the user cancels the program reservation using the reservation execution device, the corresponding program reservation in the reservation instruction device is automatically canceled. This eliminates time and labor for the user to cancel the program reservation in each of the reservation execution device and the reservation instruction device.

(11) The reservation instruction device may further include a presentation unit that presents situations where the program identifier based on the mapping information is acquired for the reservation of the program selected by the selector.

In this case, the user can easily recognize whether or not the program reservation based on the newest schedule for broadcasting is completed.

(12) According to still another aspect of the present invention, a program reservation system that receives program data transmitted from a broadcasting station, program information including a program identifier for identifying a program, extended program information including an extended program identifier for identifying the program before the program identifier is transmitted, and mapping information representing a correspondence between the extended program identifier and the program identifier includes a reservation instruction device that gives an instruction to reserve a program, and a reservation execution device that executes a reservation based on the instruction given by the reservation instruction device, in which the reservation instruction device includes a first receiver that receives the extended program information and the mapping information, a selector for selecting a program to be reserved on the basis of the extended program information received by the first receiver, and a first acquirer that acquires a program identifier corresponding to the extended program identifier for identifying the program selected by the selector on the basis of the mapping information received by the first receiver, and a transmitter that transmits an extended reservation instruction based on the extended program identifier for identifying the program selected by the selector, and then transmits a reservation instruction based on the program identifier acquired by the first acquirer, and the reservation execution device includes a second receiver that receives the program data and the extended reservation instruction or the reservation instruction that is transmitted from the reservation instruction device, a storage that stores a program reservation on the basis of the extended reservation instruction or the reservation instruction received by the second receiver, and a recorder/reproducer that records and/or reproduces the program data received by the second receiver in accordance with the program reservation stored in the storage.

In the reservation instruction device in this program reservation system, the extended program information and the mapping information is received, and the program to be reserved is selected on the basis of the received extended program information. The program identifier corresponding to the extended program identifier for identifying the selected program is acquired on the basis of the received mapping information, the extended reservation instruction based on the extended program identifier for identifying the selected program is transmitted, and the reservation instruction is then transmitted on the basis of the acquired program identifier. In the reservation execution device, the program data and the extended reservation instruction or the reservation instruction that is transmitted from the reservation instruction device are received, and the program reservation is stored on the basis of the received extended reservation instruction or reservation instruction. The program data received in accordance with the stored program reservation is recorded and/or reproduced.

In such a way, the program identifier is acquired using the mapping information from the extended program information in the reservation instruction device, the extended reservation instruction based on the extended program identifier is transmitted from the reservation instruction device to the reservation execution device, and the reservation instruction based on the program identifier is then transmitted. This causes the program reservation based on the program identifier to be executed after the program reservation based on the extended program identifier.

Here, a recording/reproducing appliance that is not adapted to the extended program information may, in some cases, be connected to the reservation instruction device. Even in such a case, the reservation instruction based on the program identifier is transmitted to the recording/reproducing appliance. In the recording/reproducing appliance that is not adapted to the extended program information, therefore, the program reservation is executed by the reservation instruction based on the program information.

Therefore, a user can execute the program reservation using the extended program information or the program information reliably and simply without being conscious of whether or not each of the reservation instruction device and the reservation execution device is adapted to the extended program information.

(13) The reservation instruction device may further include a determiner that determines whether or not the reservation execution device is adapted to the extended reservation instruction based on the extended program identifier, and the transmitter may transmit the extended reservation instruction based on the extended program identifier for identifying the program selected by the selector, and then transmit the reservation instruction on the basis of the program identifier acquired by the first acquirer when the determiner determines that the reservation execution device is adapted to the extended program identifier, while transmitting the reservation instruction on the basis of the program identifier acquired by the first acquirer when the determiner determines that the reservation execution device is not adapted to the extended program identifier.

In this case, when the reservation execution device is adapted to the extended program identifier, the program reservation based on the extended reservation instruction is executed in the reservation execution device, and the program reservation based on the reservation instruction is then executed. On the other hand, when the reservation execution device is not adapted to the extended program identifier, the program reservation based on the reservation instruction is executed in the reservation execution device.

(14) According to still another aspect of the present invention, a program reservation system that receives program data transmitted from a broadcasting station, program information including a program identifier for identifying a program, extended program information including an extended program identifier for identifying the program before the program identifier is transmitted, and mapping information representing a correspondence between the extended program identifier and the program identifier includes a reservation instruction device that gives an instruction to reserve a program, and a reservation execution device that executes a reservation based on the instruction given by the reservation instruction device, in which the reservation instruction device includes a first receiver that receives the program information, a selector for selecting a program to be reserved on the basis of the program information received by the first receiver, and a transmitter that transmits a reservation instruction in order to reserve the program selected by the selector, and the reservation execution device includes a second receiver that receives the program data, the extended program information, the mapping information, the program information, and the reservation instruction transmitted from the reservation instruction device, a first acquirer that acquires an extended program identifier from the reservation instruction received by the second receiver, a second acquirer that acquires, when the first acquirer acquires the extended program identifier, a program identifier corresponding to the extended program identifier acquired by the first acquirer on the basis of the mapping information received by the second receiver, while acquiring, when the first acquirer does not acquire the extended program identifier, a program identifier from the reservation instruction received by the second receiver, a storage that stores a program reservation on the basis of the program identifier acquired by the second acquirer, and a recorder/reproducer that records and/or reproduces the program data received by the second receiver in accordance with the program reservation stored in the storage.

In the reservation instruction device in this program reservation system, the program information is received, the program to be reserved is selected on the basis of the received program information, and the reservation instruction is transmitted in order to reserve the selected program. In the reservation execution device, the program data, the extended program information, the mapping information, the program information, and the reservation instruction transmitted from the reservation instruction device are received, and the extended program identifier is acquired from the received reservation instruction. When the extended program identifier is acquired, the program identifier corresponding to the acquired extended program identifier is acquired on the basis of the received mapping information. When the extended program identifier is not acquired, the program identifier is acquired from the received reservation instruction. The program reservation is stored on the basis of the acquired program identifier, and the received program data is recorded and/or reproduced in accordance with the stored program reservation.

In such a way, the reservation instruction based on the program identifier is transmitted from the reservation instruction device to the reservation execution device, and the program reservation based on the extended program identifier or the program reservation based on the program identifier is executed in accordance with the reservation instruction in the reservation execution device.

Here, the reservation instruction device that is not adapted to the extended program identifier may, in some cases, be connected to the reservation execution device. Even in such a case, the program reservation based on the extended program identifier or the program reservation based on the program identifier is selectively executed in the reservation execution device.

Therefore, a user can execute the program reservation using the extended program information or the program information reliably and simply without being conscious of whether or not each of the reservation instruction device and the reservation execution device is adapted to the extended program information.

(15) According to still another aspect of the present invention, a program reserving method for receiving program data transmitted from a broadcasting station, program information including a program identifier for identifying a program, extended program information including an extended program identifier for identifying the program before the program identifier is transmitted, and mapping information representing a correspondence between the extended program identifier and the program identifier includes the steps of giving an instruction to reserve a program by a reservation instruction device, and executing a reservation based on the given instruction by a reservation instruction execution device, in which the step of giving the instruction to reserve the program includes the steps of receiving the extended program information, selecting a program to be reserved on the basis of the received extended program information, and transmitting an extended reservation instruction based on an extended program identifier for identifying the selected program, and the step of executing the reservation includes the steps of receiving the program data, the mapping information, the program information, and the transmitted extended reservation instruction, acquiring an extended program identifier from the received extended reservation instruction, acquiring a program identifier corresponding to the acquired extended program identifier on the basis of the received mapping information, storing a program reservation on the basis of the acquired program identifier, and recording and/or reproducing the received program data in accordance with the stored program reservation.

In this program reserving method, in the reservation instruction device, the extended program identifier is received, the program to be reserved is selected on the basis of the received extended program information, and the extended reservation instruction based on the extended program identifier for identifying the selected program is transmitted. In the reservation execution device, the program data, the mapping information, the program information, and the extended reservation instruction transmitted from the reservation instruction device are received, and the extended program identifier is acquired from the received extended reservation instruction. The program identifier corresponding to the acquired extended program identifier is acquired on the basis of the received mapping information, and the program reservation is stored on the basis of the acquired program identifier. The received program data is recorded and/or reproduced in accordance with the stored program reservation.

In such a way, the extended reservation instruction based on the extended program identifier is transmitted from the reservation instruction device to the reservation execution device, and the program information is acquired from the extended reservation instruction using the mapping information in the reservation execution device. This causes the program reservation based on the program identifier to be executed.

Here, a recording/reproducing appliance that is not adapted to the extended program information may, in some cases, be connected to the reservation instruction device. Even in such a case, the extended reservation instruction is configured so as not to be recognized as the reservation instruction by the recording/reproducing appliance. In the recording/reproducing appliance that is not adapted to the extended program information, therefore, the program reservation is executed on the basis of a reservation instruction based on the program information.

Therefore, a user can execute the program reservation using the extended program information or the program information reliably and simply without being conscious of whether or not each of the reservation instruction device and the reservation execution device is adapted to the extended program information.

(16) According to still another aspect of the present invention, a program reserving method for receiving program data transmitted from a broadcasting station, program information including a program identifier for identifying a program, extended program information including an extended program identifier for identifying the program before the program identifier is transmitted, and mapping information representing a correspondence between the extended program identifier and the program identifier includes the steps of giving an instruction to reserve a program by a reservation instruction device, and executing a reservation based on the given instruction by a reservation execution device, in which the step of giving the instruction to reserve the program includes the steps of receiving the extended program identifier, the program information, and the mapping information, selecting a program to be reserved on the basis of the received extended program information, and acquiring a program identifier corresponding to the extended program identifier for identifying the selected program on the basis of the received mapping information, transmitting a reservation instruction based on the acquired program identifier, and presenting situations where the program identifier based on the mapping information is acquired for the reservation of the selected program, and the step of executing the reservation includes the steps of receiving the program data and the transmitted reservation instruction, storing a program reservation on the basis of the received reservation instruction, and recording and/or reproducing the received program data in accordance with the stored program reservation.

According to this program reserving method, in the reservation instruction device, the extended program identifier, the program information, and the mapping information are received, and the program to be reserved is selected on the basis of the received extended program information. The program identifier corresponding to the extended program identifier for identifying the selected program is acquired on the basis of the received mapping information, and the reservation instruction based on the acquired program identifier is transmitted. Furthermore, the situations where the program identifier based on the mapping information is acquired are presented for the reservation of the selected program. In the reservation execution device, the program data and the reservation instruction transmitted from the reservation instruction device are received, and the program reservation is stored on the basis of the received reservation instruction. The program data received in accordance with the stored program reservation is recorded and/or reproduced.

In such a way, the program identifier is acquired using the mapping information from the extended program information in the reservation instruction device, and the reservation instruction based on the program identifier is transmitted from the reservation instruction device to the reservation execution device. This causes the program reservation based on the program identifier to be executed.

Here, a recording/reproducing appliance that is not adapted to the extended program information may, in some cases, be connected to the reservation instruction device. Even in such a case, the reservation instruction based on the program identifier is transmitted to the recording/reproducing appliance. In the recording/reproducing appliance that is not adapted to the extended program information, therefore, the program reservation is executed on the basis of the reservation instruction based on the program information.

Furthermore, in the reservation instruction device, the situations where the program identifier based on the mapping information is acquired are presented for the reservation of the selected program. This allows a user to easily recognize whether or not the program reservation based on the newest schedule for broadcasting is completed.

Therefore, the user can execute the program reservation using the extended program information or the program information reliably and simply without being conscious of whether or not each of the reservation instruction device and the reservation execution device is adapted to the extended program information.

(17) According to still another aspect of the present invention, a program reserving method for receiving program data transmitted from a broadcasting station, program information including a program identifier for identifying a program, extended program information including an extended program identifier for identifying the program before the program identifier is transmitted, and mapping information representing a correspondence between the extended program identifier and the program identifier includes the steps of giving an instruction to reserve a program by a reservation instruction device, and executing a reservation based on the given instruction by a reservation execution device, in which the step of giving the instruction to reserve the program includes the steps of receiving the extended program identifier, the program information, and the mapping information, selecting a program to be reserved on the basis of the received extended program information, and acquiring a program identifier corresponding to the extended program identifier for identifying the selected program on the basis of the received mapping information, transmitting an extended reservation instruction based on the extended program identifier in order to reserve the selected program, and then transmitting a reservation instruction based on the acquired program identifier, and the step of executing the reservation includes the steps of receiving the program data and the transmitted extended reservation instruction and reservation instruction, acquiring the extended program identifier on the basis of the received extended reservation instruction and acquiring the program identifier on the basis of the received reservation instruction, storing as a provisional reservation a program reservation based on the acquired extended program identifier when the extended reservation instruction is received, and storing a program reservation based on the acquired program identifier when the reservation instruction is received, recording and/or reproducing the received program data in accordance with the stored program reservation, and making a presentation as to whether or not the program reservation is the provisional reservation.

According to this program reservation method, in the reservation instruction device, the extended program identifier, the program information, and the mapping information are received, the program to be reserved is selected on the basis of the received extended program information, and the program identifier corresponding to the extended program identifier for identifying the selected program is acquired on the basis of the received mapping information. After the extended reservation instruction based on the extended program identifier is transmitted in order to reserve the selected program, the reservation instruction based on the acquired program identifier is transmitted. In the reservation execution device, the program data and the extended reservation instruction and the reservation instruction that are transmitted from the reservation instruction device are received, the extended program identifier is acquired on the basis of the received extended reservation instruction, and the program identifier is acquired on the basis of the reservation instruction. The program reservation based on the extended program identifier acquired when the extended reservation instruction is received is stored as the provisional reservation, and the program reservation based on the program identifier acquired when the reservation instruction is received is stored. The program data received in accordance with the stored program reservation is recorded and/or reproduced. Furthermore, the presentation is made as to whether or not the stored program reservation is the provisional reservation.

In such a way, the program identifier is acquired using the mapping information from the extended program information in the reservation instruction device, the extended reservation instruction based on the extended program identifier is transmitted as the provisional reservation from the reservation instruction device to the reservation execution device, and the reservation instruction based on the program identifier is then transmitted. This causes the program reservation based on the program identifier to be executed after the provisional program reservation based on the extended program identifier.

Here, a recording/reproducing appliance that is not adapted to the extended program information may, in some cases, be connected to the reservation instruction device. Even in such a case, the reservation instruction based on the program identifier is transmitted to the recording/reproducing appliance. In the recording/reproducing appliance that is not adapted to the extended program information, therefore, the program reservation is executed by the reservation instruction based on the program information.

Furthermore, the presentation is made as to whether or not the stored program reservation is the provisional reservation in the reservation execution device. This allows a user to easily recognize whether or not the program reservation based on the newest schedule for broadcasting is completed.

Therefore, the user can execute the program reservation using the extended program information or the program information reliably and simply without being conscious of whether or not each of the reservation instruction device and the reservation execution device is adapted to the extended program information.

(18) According to still another aspect of the present invention, a program reserving method for receiving program data transmitted from a broadcasting station, program information including a program identifier for identifying a program, extended program information including an extended program identifier for identifying the program before the program identifier is transmitted, and mapping information representing a correspondence between the extended program identifier and the program identifier includes the steps of giving an instruction to reserve a program by a reservation instruction device, and executing a reservation based on the given instruction by a reservation execution device, in which the step of giving the instruction to reserve the program includes the steps of receiving the extended program information, selecting a program to be reserved on the basis of the received extended program information, and acquiring a program identifier corresponding to the extended program identifier for identifying the selected program on the basis of the received mapping information, and transmitting an extended reservation instruction based on the extended program identifier for identifying the selected program, and then transmitting a reservation instruction based on the acquired program identifier, and the step of executing the reservation includes the steps of receiving the program data and the transmitted extended reservation instruction or reservation instruction, storing a program reservation on the basis of the received extended reservation instruction or reservation instruction, and recording and/or reproducing the received program data in accordance with the stored program reservation.

According to this program reservation method, in the reservation instruction device, the extended program identifier is received, and the program to be reserved is selected on the basis of the received extended program information. The program identifier corresponding to the extended program identifier for identifying the selected program is acquired on the basis of the received mapping information, the extended reservation instruction based on the extended program identifier for identifying the selected program is transmitted, and the reservation instruction is then transmitted on the basis of the acquired program identifier. In the reservation execution device, the program data and the extended reservation instruction or the reservation instruction that is transmitted from the reservation instruction device are received, and the program reservation is stored on the basis of the received extended reservation instruction or reservation instruction. The program data received in accordance with the stored program reservation is recorded and/or reproduced.

In such a way, the program identifier is acquired using the mapping information from the extended program information in the reservation instruction device, the extended reservation instruction based on the extended program identifier is transmitted from the reservation instruction device to the reservation execution device, and the reservation instruction based on the program identifier is then transmitted. This causes the program reservation based on the program identifier to be executed after the program reservation based on the extended program identifier.

Here, a recording/reproducing appliance that is not adapted to the extended program information may, in some cases, be connected to the reservation instruction device. Even in such a case, the reservation instruction based on the program identifier is transmitted to the recording/reproducing appliance. In the recording/reproducing appliance that is not adapted to the extended program information, therefore, the program reservation is executed on the basis of the reservation instruction based on the program information.

Therefore, a user can execute the program reservation using the extended program information or the program information reliably and simply without being conscious of whether or not each of the reservation instruction device and the reservation execution device is adapted to the extended program information.

(19) According to still another aspect of the present invention, a program reserving method for receiving program data transmitted from a broadcasting station, program information including a program identifier for identifying a program, extended program information including an extended program identifier for identifying the program before the program identifier is transmitted, and mapping information representing a correspondence between the extended program identifier and the program identifier includes the steps of giving an instruction to reserve a program by a reservation instruction device, and executing a reservation based on the given instruction by a reservation execution device, in which the step of giving the instruction to reserve the program includes the steps of receiving the program information, selecting a program to be reserved on the basis of the received program information, and transmitting a reservation instruction based on the program identifier in order to reserve the selected program, and the step of executing the reservation includes the steps of receiving the program data, the extended program information, the mapping information, the program information, and the transmitted reservation instruction, acquiring an extended program identifier from the received reservation instruction, acquiring, when the extended program identifier is acquired, a program identifier corresponding to the acquired extended program identifier on the basis of the received mapping information, while acquiring, when the extended program identifier is not acquired, a program identifier from the received reservation instruction, storing a program reservation on the basis of the acquired program identifier, and recording and/or reproducing the received program data in accordance with the stored program reservation.

According to this program reservation method, in the reservation instruction device, the program information is received, the program to be reserved is selected on the basis of the received program information, and the reservation instruction based on the program identifier is transmitted in order to reserve the selected program. In the reservation execution device, the program data, the extended program information, the mapping information, the program information, and the reservation instruction transmitted from the reservation instruction device are received, and the extended program identifier is acquired from the received reservation instruction. When the extended program identifier is acquired, the program identifier corresponding to the acquired extended program identifier is acquired on the basis of the received mapping information. When the extended program identifier is not acquired, the program identifier is acquired from the received reservation instruction. The program reservation is stored on the basis of the acquired program identifier, and the received program data is recorded and/or reproduced in accordance with the stored program reservation.

In such a way, the reservation instruction based on the program identifier is transmitted from the reservation instruction device to the reservation execution device, and the program reservation based on the extended program identifier or the program reservation based on the program identifier is executed in accordance with the reservation instruction in the reservation execution device.

Here, the reservation instruction device that is not adapted to the extended program identifier may, in some cases, be connected to the reservation execution device. Even in such a case, the program reservation based on the extended program identifier or the program reservation based on the program identifier is selectively executed in the reservation execution device.

Therefore, a user can execute the program reservation using the extended program information or the program information reliably and simply without being conscious of whether or not each of the reservation instruction device and the reservation execution device is adapted to the extended program information.

Effects of the Invention

According to the present invention, a user can execute a program reservation using extended program information or program information reliably and simply without being conscious of whether or not each of a reservation instruction device and a reservation execution device is adapted to the extended program information.

BRIEF DESCRIPTION OF THE DRAWINGS

FIG. 1 is a block diagram showing the configuration of a program reservation system according to a first embodiment of the present invention.

FIG. 2 is a diagram showing an example of enlarged program information, an example of mapping information, and an example of program information.

FIG. 8 is a diagram showing an example of a reservation list window.

FIG. 12 is a flow chart showing reservation cancellation processing of a recording device in the program reservation system according to the third embodiment of the present invention.

FIG. 18 is a schematic view showing reservation registration processing of a recording device in the program reservation system according to the sixth embodiment of the present invention.

BEST MODE FOR CARRYING OUT THE INVENTION

Figure 3:
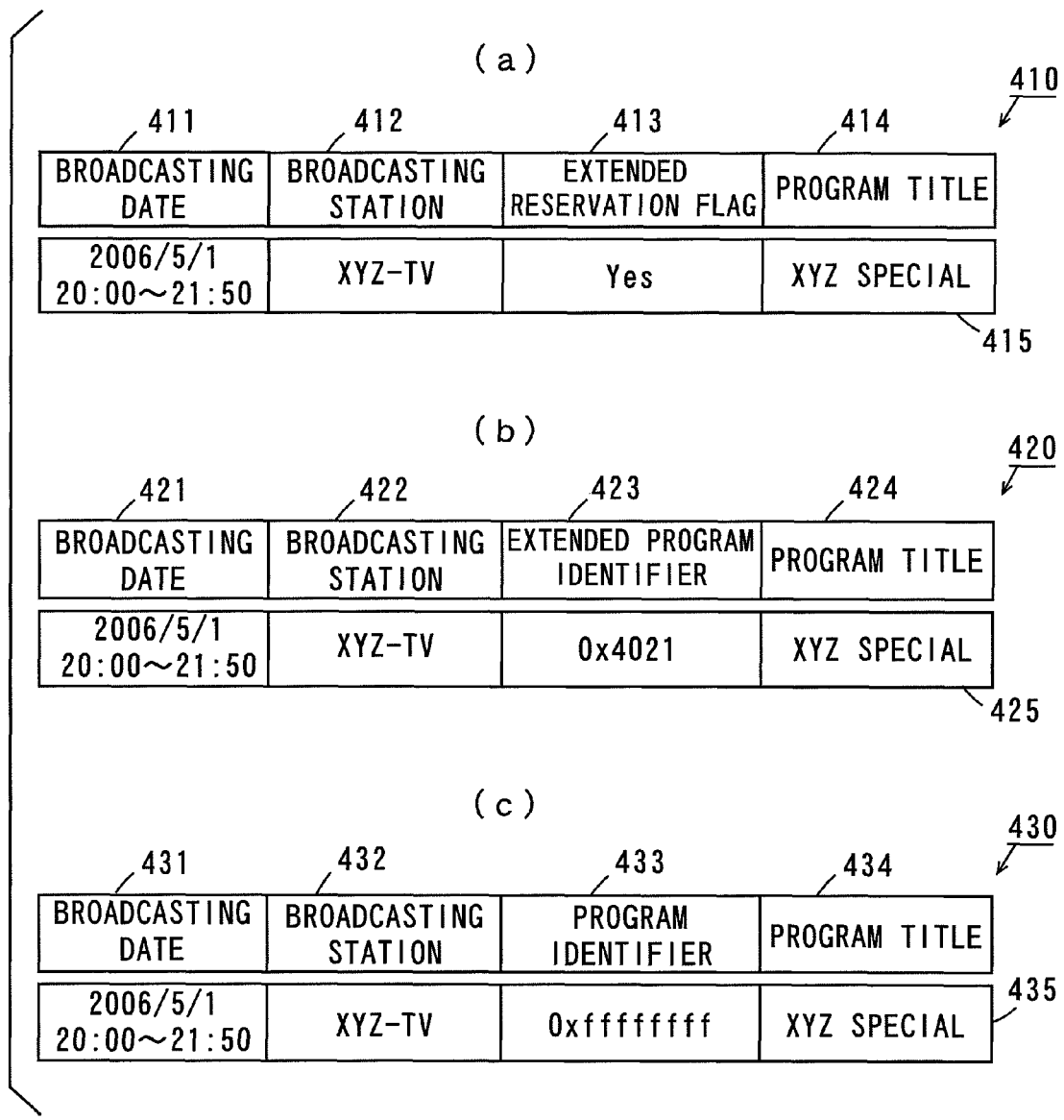
FIG. 3 is a diagram showing an example of an enlarged reservation instruction in the first embodiment of the present invention.

The embodiments of the present invention will be described in detail referring to the drawings. The embodiments below describe program reservation systems. Among a plurality of drawings, the same constituent elements are assigned the same reference numerals and hence, a part or the whole of the description thereof is not repeated. When a plurality of same constituent elements appear in the same drawing, the end of a sign is assigned to one alphabetic character and hence, a part or the whole thereof is not repeated.

(1) First Embodiment

FIG. 1 is a block diagram showing the configuration of a program reservation system according to a first embodiment of the present invention.

The program reservation system includes a receiving antenna 110, a receiving device 120, and a recording device 130.

The receiving device 120 is a reservation instruction device that gives an instruction to timer-record or timer-reproduce a program. Furthermore, the recording device 130 is a reservation execution device that executes a reservation based on the instruction given by the receiving device 120.

The receiving antenna 110 receives a broadcasting radio wave, and converts the broadcasting radio wave into an antenna signal serving as an electrical signal and outputs the antenna signal. The receiving antenna 110 is a receiving antenna for normal television broadcasting. The antenna signal includes data representing a program itself (hereinafter referred to as program data) and data appended to a program (hereinafter referred to as appendant data), for example, programming information. Here, the program data is data for reproducing a program, and is composed of video data and sound data, for example.

Although description is now made of an example in which the program data and the appendant data are transmitted to the program reservation system by broadcasting, the present invention is practicable by all data and information transmission systems. For example, the program data and the appendant data may be transmitted to the program reservation system by a storage-type broadcasting service, streaming by communication, file sharing, file downloading, or a push-type service. Alternatively, the program data and the appendant data may be transmitted to the program reservation system by physical delivery of package media such as a DVD (Digital Versatile Disk) and a BD (Blue-Ray Disk). Alternatively, a part of the program data or the appendant data may be transmitted by a transmission system other than the transmission systems for transmitting the other program data or appendant data.

The receiving device 120 reproduces the program included in the antenna signal obtained by the receiving antenna 110. Furthermore, the receiving device 120 displays a program listing representing a schedule for program broadcasting, and registers timer-recording or timer-reproduction of a program selected from the program listing by a user in the recording device 130.

The receiving device 120 includes a receiver 121, a program information storage 122, a mapping information storage 123, a reservation manager 124, an extended reservation manager 125, an instruction transmitter/receiver 126, a UI (User Interface) processor 127, a presentation unit 128, and an operation input unit 129. Here, the components in the receiving device 120 will be described in detail.

The receiver 121 selectively extracts only program data and appendant data that are transmitted by a particular broadcasting station from the antenna signal received by the receiving antenna 110. The receiver 121 has a configuration adapted to the transmission system for the program data and the appendant data. When communication technology is used for the transmission system, the receiver 121 receives communication data.

The receiver 121 selects and decodes only a particular modulation frequency, to output program data and appendant data that compose a program broadcast at a particular broadcasting station. The receiver 121 is constituted by a high-frequency tuner and a TS (Transport Stream) decoder in a digital broadcasting receiving device, for example.

The program information storage 122 stores programming information and extended program information that are included in the appendant data outputted by the receiver 121. The programming information is composed of a plurality of program information. The details of the program information and the extended program information will be described later.

The mapping information storage 123 stores mapping information included in the appendant data outputted by the receiver 121. The details of the mapping information will be described later.

The program information, the extended program information, and the mapping information need not be transmitted to the receiving device 120 and the recording device 130 through the same transmission path. For example, the program information may be acquired through broadcasting, the extended program information may be acquired using package media attached to a program information magazine, and the mapping information may be acquired via network communication. Alternatively, the receiving device 120 may receive all or some of the information from broadcasting. The recording device 130 may receive all or some of the information via network communication. Alternatively, it may receive all or some of the information from the receiving device 120.

Furthermore, all the program data need not be acquired from the broadcasting station. The recording device 130 may download some of the program data or may subject the program data to streaming reproduction via a network from a video server at the broadcasting station.

Note that the title of the program, the genre of the program, a descriptive text of the program, performers, link information to related information, or the like may be added to the mapping information or the extended program information.

The reservation manager 124 manages a reservation registered by the user. In this case, the reservation manager 124 transmits an instruction to the recording device 130 via the instruction transmitter/receiver 126, and controls the recording device 130. This causes a reservation function to be realized as the whole of the program reservation system.

Here, "reservation" is the function of starting to record or reproduce a program on a set date.

Furthermore, "registration of reservation" means that a reservation entry is stored in the program reservation system. The registration of a reservation is required from the UI processor 127 with a user's operation of the operation input unit 129 as a trigger. The reservation manager 124 stores the reservation entry in accordance with the requirement. This causes the registration of the reservation to be realized.

Furthermore, "execution of reservation" means that video and sound of a program are actually recorded or reproduced from the time when the program starts to be broadcast in accordance with a reservation entry.

Specifically, the reservation manager 124 stores and manages the reservation entry registered by the user. The reservation entry is information required to execute the reservation, and includes a part or the whole of the program information or the extended program information stored in the program information storage 122.

The extended reservation manager 125 compares the reservation entry stored in the reservation manager 124 with the mapping information received by the receiver 121, to cause an extended program identifier included in the reservation entry based on the extended program information to correspond to a program identifier. The correspondence allows the reservation entry based on the extended program information to be treated substantially the same as a reservation entry based on the program information.

Note that the extended program identifier may be a set of a broadcasting station and a broadcasting date, an ID (identifier) automatically created by count-up using a transmission device or the like, an ID (identifier) inputted by an operator who inputs program information, a string of characters composing the title of a program, or their combinations. Alternatively, used as the extended program information may be values obtained by converting the information using any transfer function such as a hash function.

The instruction transmitter/receiver 126 transmits an instruction to the recording device 130. Note that a method of transmitting data representing the instruction from the instruction transmitter/receiver 126 to the recording device 130 is not limited. For example, the receiving device 120 and the recording device 130 may be connected to each other by wire communication. Alternatively, a transmission structure such as the Internet, a file sharing system, or the like is interposed between the receiving device 120 and the recording device 130, so that the receiving device 120 and the recording device 130 may be spatially or temporally spaced apart from each other.

Used as the instruction transmitter/receiver 126 is a remote control signal generator using infrared rays, a transmitter using a CEC (Consumer Electronics Control) defined by a HDMI (High Definition Multimedia Interface), a transmitter using an IP (Internet Protocol), or the like. The HDMI is a transmission interface for a digital video/sound signal.

The instruction transmitted by the instruction transmitter/receiver 126 includes an instruction to register a reservation in the recording device 130, an instruction to immediately start or terminate recording by the recording device 130, and so on. The instruction to register a reservation includes information relating to a date, a broadcasting station, and so on. The recording device 130 starts to record or reproduce a program broadcast at a broadcasting station designated on a date designated in the instruction transmitted by the instruction transmitter/receiver 126.

The UI processor 127 manages a dialogue with the user while controlling the whole receiving device 120. The dialogue with the user is realized by a so-called GUI (Graphic User Interface) for accepting the user's operation of the operation input unit 129 and providing information to the presentation unit 128. That is, the UI processor 127 displays a part of the state of the receiving device 120 by graphic display using an OSD (On Screen Display) in the presentation unit 128 while changing the graphic display by the user's operation of the operation input unit 129. This results in transition of the state of the receiving device 120. Furthermore, the UI processor 127 reproduces the program data outputted from the receiver 121, generates an EPG graphic display image from the programming information stored in the program information storage 122, generates all OSD graphic display images, or provides their synthetic outputs, for example.

The presentation unit 128 presents to the user video/sound data outputted from the UI processor 127. The presentation unit 128 includes a display panel such as a plasma display panel or a liquid crystal display panel, and a sound generator such as a speaker.

The operation input unit 129 is an input device that inputs an operation for the receiving device 120 from the user. The operation input unit 129 is composed of a combination of a remote control main body and a remote control signal receiver, a keyboard, a pointing device such as a mouse, a sound input device, or the like, or their combinations.

The recording device 130 includes a receiver 121a, a program information storage 122a, a mapping information storage 123a, an instruction transmitter/receiver 131, an extended reservation executor 132, a reservation executor 133, and a program recorder/reproducer 134. Here, the components in the recording device 130 will be described in detail.

The configurations and the functions of the receiver 121a, the program information storage 122a, and the mapping information storage 123a in the recording device 130 are respectively the same as the configurations and the functions of the receiver 121, the program information storage 122, and the mapping information storage 123 in the receiving device 120.

The instruction transmitter/receiver 131 receives the instruction transmitted from the instruction transmitter/receiver 126 in the receiving device 120. The instruction transmitter/receiver 131 is composed of a receiving circuit that is adapted to a physical/logical communication interface used in the instruction transmitter/receiver 126.

The extended reservation executor 132 controls the reservation executor 133 using the instruction received by the instruction transmitter/receiver 131 and mapping information received by the receiver 121a, to execute a program reservation based on extended program information.

The reservation executor 133 executes a program reservation in accordance with the instruction from the instruction transmitter/receiver 131. In this case, the reservation executor 133 instructs the receiver 121a of a broadcasting station to be selected at a predetermined time while causing the program recorder/reproducer 134 to start to record program data outputted from the receiver 121a. This causes the reservation to be executed. The reservation executor 133 stores, when it receives a reservation instruction, information relating to the reservation instruction as a reservation entry. The reservation instruction includes information relating to a broadcasting date on which and a broadcasting station at which a program to be reserved is broadcast. The reservation executor 133 starts to record program data transmitted from a broadcasting station designated on a broadcasting date designated in the program recorder/reproducer 134. The reservation executor 133 causes, when it receives an instruction to immediately start recording, the program recorder/reproducer 134 to immediately record program data transmitted from a broadcasting station designated by the instruction from the time point where it receives the instruction.

The program recorder/reproducer 134 records the program data received by the receiver 121a while reproducing video/sound data based on the program data, as needed. The reproduced video/sound data is synthesized by being inputted to the UI processor 127 in the receiving device 120, and is outputted to the presentation unit 128. This allows the user to view the program.

FIG. 2 (a) is a diagram showing an example of extended program information, FIG. 2 (b) is a diagram showing an example of mapping information, and FIG. 2 (c) is a diagram showing an example of program information.

Table 230 in FIG. 2 (c) shows the program information. A plurality of program information compose programming information. In Table 230, a column 231 stores a broadcasting date, a column 232 stores a broadcasting station, a column 233 stores a program identifier used for identifying a program, and a column 234 stores a program title.

Table 210 in FIG. 2 (a) shows the extended program information. In Table 210, a column 211 stores a broadcasting date, a column 212 stores a broadcasting station, a column 213 stores an extended program identifier used for identifying a program, and a column 214 stores a program title. That is, the extended program information includes the extended program identifier in place of a program identifier in normal program information.

The extended program identifier must be unique to at least the whole extended program information at any time point. The extended program identifier is assigned to the program by a transmission device separate from a device for assigning the program identifier to the program. Therefore, the value of the program identifier is undefined at the time point where the extended program information is generated. The value of the program identifier is not assigned to the program and defined until a predetermined time period before the program corresponding to the program information is actually broadcast. For example, the value of the program identifier is defined by an operator at a broadcasting station inputting programming information based on the program identifier on the day before the programming information is transmitted, for example.

In the broadcasting system, mapping information for establishing a one-to-one correspondence between the extended program identifier and the program identifier is generated and broadcast at the time point where the value of the program identifier is defined.

Table 220 in FIG. 2 (b) shows the mapping information. In the mapping information, each row corresponds to one program. A column 221 stores a broadcasting date, a column 222 stores a broadcasting station, a column 223 stores an extended program identifier, and a column 224 stores a program identifier. This causes the extended program identifier to correspond to the program identifier.

Reservation processing using the extended program information is performed in the following manner. First, the extended program information is presented to the user in place of the program information. The user selects the extended program identifier, to determine a program to be reserved. The selected extended program information is stored as a reservation entry in the reservation manager 124.

Then, when the receiver 121 receives the mapping information a predetermined time period before the broadcasting, the mapping information is stored in the mapping information storage 123. It is determined whether or not any of the reservation entries stored in the reservation manager 124 has an extended program identifier that coincides with the extended program identifier in the received mapping information. When the extended program identifier in the received mapping information coincides with the extended program identifier in any of the reservation entries, a program identifier corresponding to the extended program identifier is determined. For example, an extended program identifier in mapping information 225 shown in FIG. 2 (b) coincides with an extended program identifier in extended program information 215 shown in FIG. 2 (a). This proves that a program identifier corresponding to a program title "XYZ Special" is "0x1002a102".

Program information is retrieved on the basis of the determined program identifier. This allows information such as a broadcasting date, a broadcasting station, and a program title included in the retrieved program information to be obtained. For example, program information 235 is retrieved on the basis of a program identifier in the mapping information 225. This proves that a broadcasting date on which a program corresponding to the program identifier "0x1002a102" is broadcast is "2006/5/2 at 21:00~22:50", a broadcasting station at which the program is broadcast is "XYZ-TV", and the title of the program is "XYZ special 2006".

Mapping information is transmitted after the time point where a program identifier is assigned to a program, and is typically transmitted at a time point, dating back a predetermined time period, where programming information is transmitted, from a broadcasting date on which the program is broadcast. For example, mapping information is transmitted seven days before a broadcasting date on which a program is broadcast.

When the extended program identifier in any of the reservation entries coincides with the extended program identifier in the received mapping information, as described above, the program identifier in the reservation entry is determined. At the time point, a reservation instruction is generated using program information including the determined program identifier and is transmitted to the recording device 130. The reservation instruction includes a broadcasting date on which and a broadcasting station at which a program is broadcast.

Although in the present embodiment, the mapping information is information separate from the program information and the extended program information, it may use a form storing a combination of a plurality of information. For example, a field storing a program identifier may be provided in the extended program information. In this case, a case where the program identifier is stored in the field can be treated the same as a case where the extended program information and the mapping information exist. Furthermore, a field storing an extended program identifier may be provided in the program information. In this case, a case where the extended program identifier is stored in the field can be treated the same as a case where the program information and the mapping information exist.

Realization of an extended reservation in the program reservation system according to the first embodiment of the present invention will be then described in detail using the drawings.

FIG. 3 is a diagram showing an example of an extended reservation instruction in the first embodiment of the present invention.

An extended reservation instruction 410 shown in FIG. 3 (a) includes a field 413 storing an extended reservation flag in addition to fields 411, 412, and 414 respectively storing a broadcasting date on which a program to be reserved is broadcast, a broadcasting station at which the program is broadcast, and the title of the program. A format of the extended reservation instruction 410 is the field 413 storing an extended reservation flag added to a reservation instruction based on program information.

It is preferable that a place (field) where the extended reservation flag is stored in the format is determined such that a recording appliance that is not adapted to extended program information (hereinafter referred to as a noncompliant recording appliance) can normally register a reservation. This allows the reservation to be registered as a normal program reservation based on program information in the noncompliant recording appliance. In this case, the receiving device 120 can maintain upward compatibility with the noncompliant recording appliance. For example, a bit position that exists but is not referred to may be utilized as the location (field) where the extended reservation flag is stored. Alternatively, the extended reservation flag may be arranged after a terminal symbol representing the end of a string of characters.

Note that an extended reservation instruction may include a program identifier. In this case, the fields 411 and 412 respectively storing a broadcasting date and a broadcasting station may be omitted. In the recording device 130, a broadcasting date on which and a broadcasting station at which a program is broadcast can be obtained by retrieving program information with a program identifier used as retrieval conditions. Such a program identifier causes a reservation instruction for specifying a program to be interpreted. In this case, the receiving device 120 can also similarly maintain upward compatibility with a recording appliance that ignores the value of an extended reservation flag.

Then, an extended reservation instruction 420 shown in FIG. 3 (b) includes a field 423 storing an extended reservation identifier in addition to fields 421, 422, and 424 respectively storing a broadcasting date on which a program to be reserved is broadcast, a broadcasting station, and the title of the program. The necessity of retrieving the value of an extended program identifier in the recording device 130 is eliminated by directly passing the extended program identifier to the recording device 130. A format of the extended reservation instruction 420 is determined such that a place ignored by a noncompliant recording appliance is selected as the field 423 storing an extended program identifier. This allows the receiving device 120 to maintain upward compatibility with the noncompliant recording appliance.

Then, an extended reservation instruction 430 shown in FIG. 3 (c) includes fields 431, 432, 433, and 434 respectively storing a broadcasting date 431 on which a program to be reserved is broadcast, a broadcasting station 432, a program identifier 433, and the title of the program 434, and the field 433 storing a program identifier stores a special value. A format of the extended reservation instruction 430 is common to a format of a reservation instruction based on a normal program identifier, so that the receiver 120 can maintain upward compatibility with a noncompliant recording appliance.

Note that each of the extended reservation instructions 410, 420, and 430 need not include the title of a program. In this case, a string of characters composing the title of the program may be acquired using program information or extended program information in the receiving device 130. Alternatively, an extended reservation instruction, including the genre of the program, a descriptive text of the program, performers, or link information to related information, and so on, may be configured.

Description is then made of reservation registration processing of the program reservation system according to the first embodiment.

Figure 4:
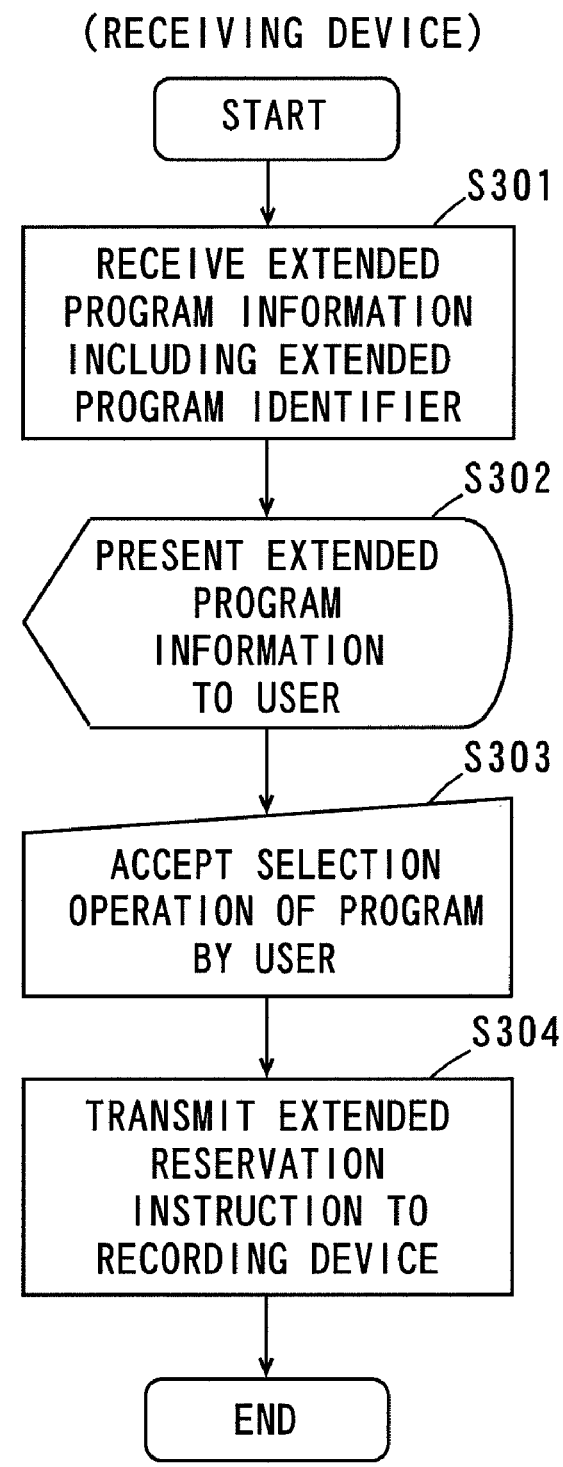
FIG. 4 is a flow chart showing reservation registration processing of a receiving device in the program reservation system according to the first embodiment of the present invention.

FIG. 4 is a flow chart showing reservation registration processing of the receiving device in the program reservation system according to the first embodiment of the present invention.

First, the receiver 121 receives extended program information including an extended program identifier (step S301). The extended program information is stored in the program information storage 122.

Then, the presentation unit 128 presents the extended program information stored in the program information storage 122 to a user (step S302). For example, the UI processor 127 converts the extended program information into a graphic display image, and outputs the graphic display image to the presentation unit 128. Thus, the presentation unit 128 displays the extended program information using the graphic display image. Specific examples of the graphic display image include forms such as a program listing and a list of a plurality of programs. The user moves a focus displayed on the program listing to a program to be reserved using a cursor button in the operation input unit 129, and determines the program using a predetermined determination button.

Note that in the graphic display image, program information and extended program information may be mixed. In this case, the extended program information may be displayed in the form of one program listing obtained by integrating the program information and the extended program information, for example. Alternatively, when the extended program information is caused to correspond to the program information stored in the program information storage 122, a GUI may be configured such that the user is induced to display the extended program information when the program information is presented. Examples of the timing at which the program information is presented include the time when a program listing is displayed, the time when viewing of a program corresponding to the program information is started, and the time when the viewing is terminated.

Furthermore, when the presentation unit 128 outputs the program information by not video but sound, the title of the program may be read out.

Then, the operation input unit 129 accepts a user's operation for selecting the program (step S303). The user operates the operation input unit 129, to select the extended program information relating to a program to be reserved out of the extended program information presented in the step S302. This processing is performed by the UI processor 127 specifying the extended program information selected by the user on the basis of the user's operation accepted by the operation input unit 129.

Then, the reservation manager 124 converts the selected extended program information into an extended reservation instruction, and the instruction transmitter/receiver 126 transmits the extended reservation instruction obtained by the conversion to the recording device 130 (step S304).

Figure 5:
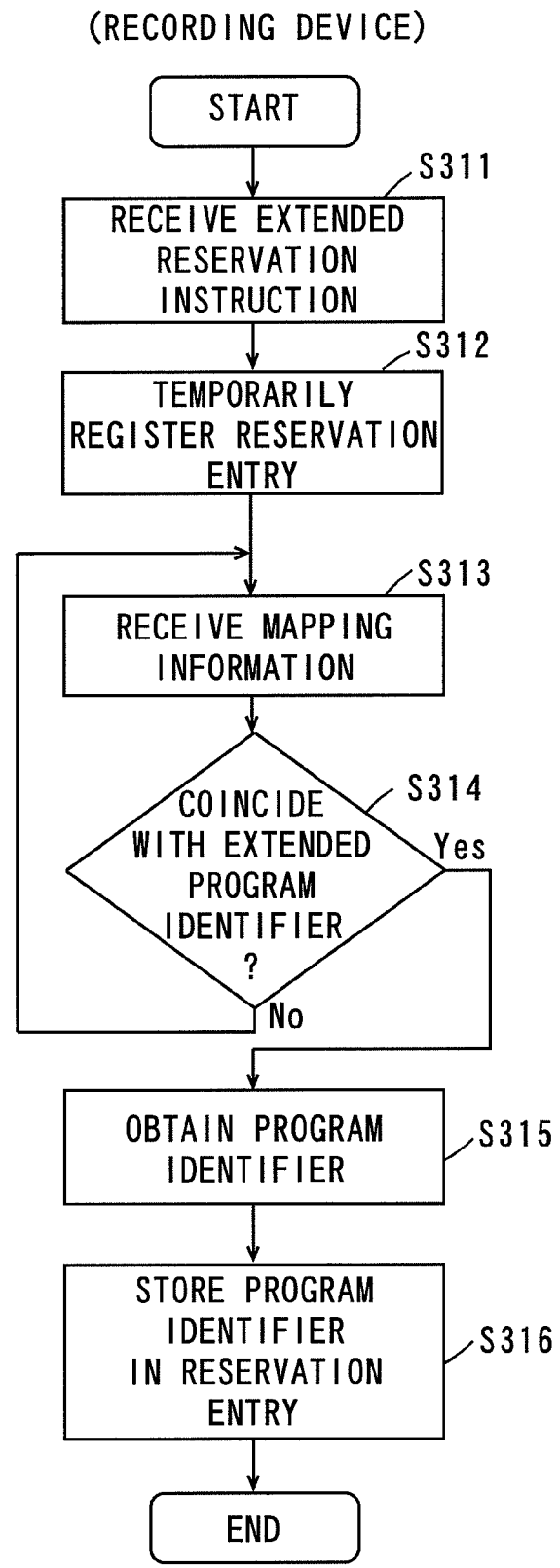
FIG. 5 is a flow chart showing reservation registration processing of a recording device in the program reservation system according to the first embodiment of the present invention.

FIG. 5 is a flow chart showing reservation registration processing of the recording device in the program reservation system according to the first embodiment of the present invention.

First, the instruction transmitter/receiver 131 receives an extended reservation instruction (step S311). Then, the extended reservation executor 132 creates a reservation entry from the received extended reservation instruction, and provisionally registers the generated reservation entry in the reservation executor 133 (step S312).

When an extended program identifier is not stored in the extended reservation instruction, the extended program identifier is found using another field in the extended reservation instruction, and the found extended program identifier is stored in a field in the reservation entry. For example, for the extended reservation instruction 410 shown in FIG. 3, extended program information stored in the program information storage 122a is retrieved with a broadcasting date and a broadcasting station as retrieval conditions, and an extended program identifier is found from the results of the retrieval.

Then, the receiver 121a receives mapping information (step S313). The received mapping information is stored in the mapping information storage 123a.

Note that mapping information stored in the mapping information storage 123a before the extended reservation instruction is received is similarly processed. This allows a reservation to be similarly registered even when a program is reserved on the basis of extended program information within a predetermined time period during which programming information is transmitted.

Then, the extended reservation executor 132 determines whether or not an extended program identifier in the received mapping information coincides with an extended program identifier in any of the reservation entries stored in the reservation executor 133 (step S314).

When the extended program identifier in the mapping information coincides with the extended program identifier in any of the reservation entries, the extended reservation executor 132 obtains a program identifier from the mapping information (step S315).

When the extended program identifier in the mapping information does not coincide with the extended program identifier in any of the reservation entries, the procedure is returned to the step S313.

Furthermore, the extended reservation executor 132 stores the program identifier in the reservation entry within the reservation executor 133 having the extended program identifier that coincides with the extended program identifier in the mapping information in the step S314 (step S316). This processing causes the reservation entry to include information identical to that in a case where a reservation is registered on the basis of program information.

As described in the foregoing, even when the reservation is registered on the basis of the extended program information, the same functionality as that in a case where the reservation is registered on the basis of the program information can be realized. That is, it is possible to follow the program, use an event relay, or change the title of the program, for example.

Furthermore, by selecting an upward compatibility format of a noncompliant recording appliance as a format of the extended reservation instruction, a reservation is normally registered and executed unless at least a broadcasting date on which or a broadcasting station at which a program is broadcast is changed when the same extended reservation instruction is transmitted to the noncompliant recording appliance. Therefore, a user can utilize a reservation based on extended program information without being conscious of whether or not the type of the recording device is adapted to the extended program information.

Note that the title of the program, the genre of the program, a descriptive text of the program, performers, link information to related information, and so on may be transmitted simultaneously with the extended reservation instruction. Alternatively, the program information stored in the program information storage 122a in the recording device 130 may be referred to.

(2) Second Embodiment

Figure 6:
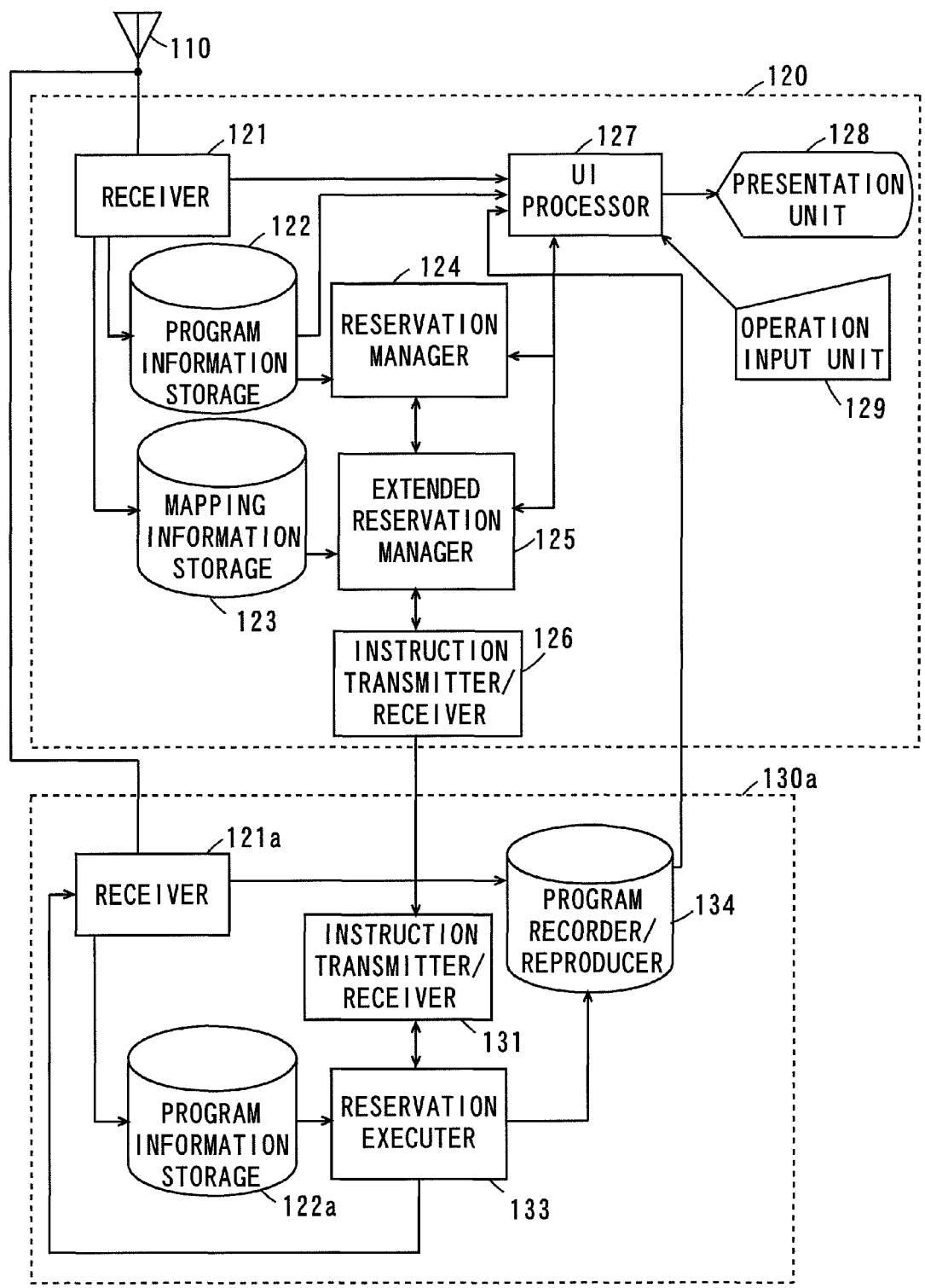
FIG. 6 is a block diagram showing the configuration of a program reservation system according to a second embodiment of the present invention.

FIG. 6 is a block diagram showing the configuration of a program reservation system according to a second embodiment of the invention.

The configuration of a receiving device 120 shown in FIG. 6 is the same as the configuration of the receiving device 120 shown in FIG. 1. The operation of the receiving device 120 shown in FIG. 6 differs from the operation of the receiving device 120 shown in FIG. 1, as described below.

Furthermore, a recording device 130a shown in FIG. 6 differs in configuration from the recording device 130 shown in FIG. 1 in that it does not include a mapping information storage 123a and an extended reservation executor 132.

Figure 7:
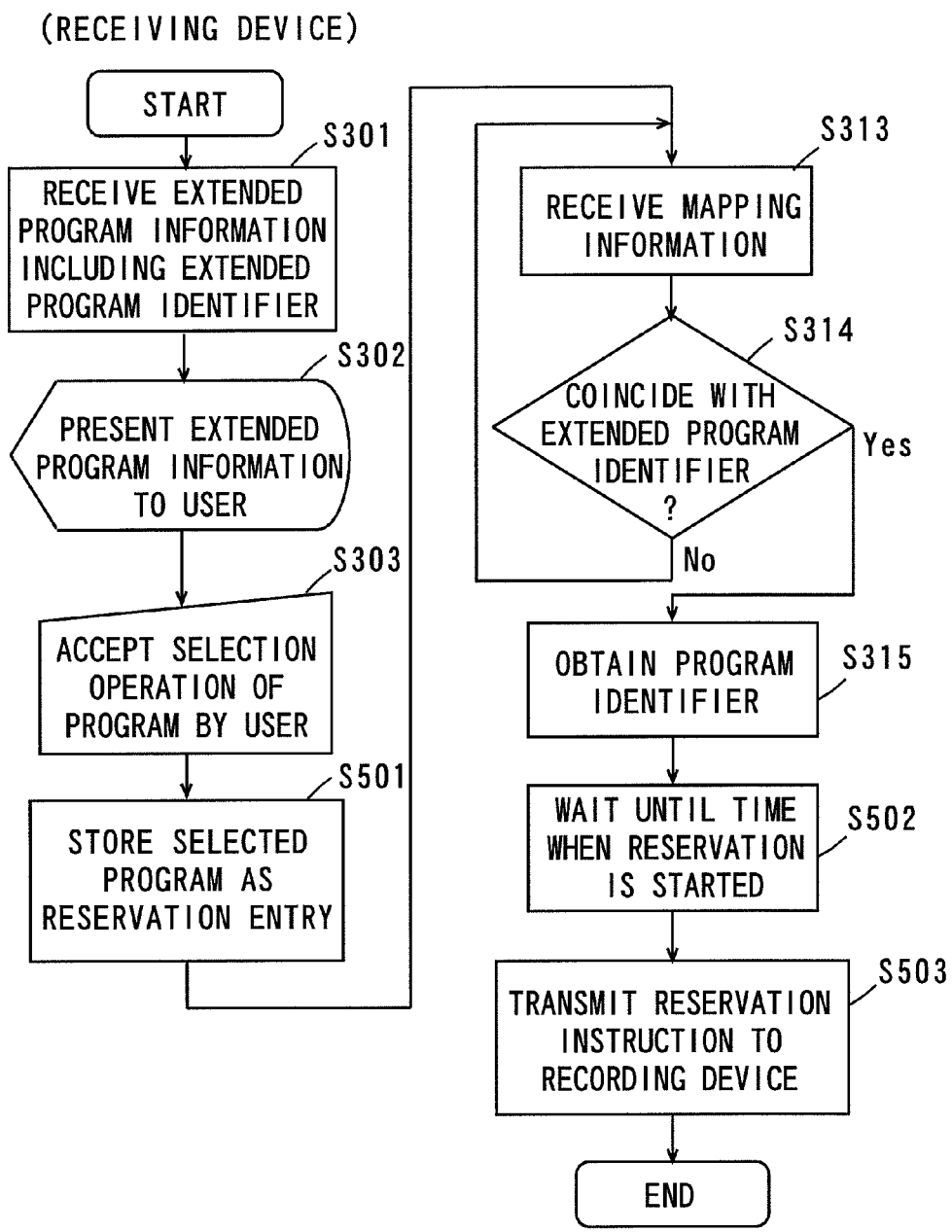
FIG. 7 is a flow chart showing reservation registration processing of a receiving device in the program reservation system according to the second embodiment of the present invention.

FIG. 7 is a flow chart showing reservation registration processing of the receiving device in the program reservation system according to the second embodiment of the present invention.

Processes in the steps S301 to S303 shown in FIG. 7 are the same as the processes in the steps S301 to S303 shown in FIG. 4.

An extended reservation manager 125 stores a reservation entry relating to a program selected in the step S303 (step S501).

Then, a receiver 121 receives mapping information (step S313). The received mapping information is stored in a mapping information storage 123.

Then, the extended reservation manager 125 determines whether or not an extended program identifier in the received mapping information coincides with an extended program identifier in any of the reservation entries stored in the extended reservation manager 125 (step S314).

When the extended program identifier in the mapping information coincides with the extended program identifier in any of the reservation entries, the extended reservation manager 125 obtains a program identifier from the mapping information (step S315).

When the extended program identifier in the mapping information does not coincide with the extended program identifier in any of the reservation entries, the procedure is returned to the step S313.

Then, the extended reservation manager 125 waits until the time when a reserved program is started (step S502). At the time when the reserved program is started, the extended reservation manager 125 generates a reservation instruction using the program identifier obtained in the step S315, and an instruction transmitter/receiver 126 transmits the generated reservation instruction to the recording device (step S503).

As described in the foregoing, in the present embodiment, when the mapping information having the extended program identifier that coincides with the extended program identifier in the reservation entry in the step S314 is received, a normal reservation instruction that is not an extended reservation instruction is transmitted to the recording device 130a. Therefore, the program reservation system according to the present embodiment is feasible using a noncompliant recording device 130a.

Program information, extended program information, mapping information, and son on are not necessarily stored simultaneously in the receiving device 120 and the recording device 130a. It is possible to assume a case where the information cannot be received because the recording device 130a is recording a certain program, a case where the main power to the recording device 130a is turned off for several days, or a case where receiving conditions or receiving capabilities of broadcasting in the recording device 130a differ from those in the receiving device 120, for example. When sufficient information is not stored in the recording device 130a, as compared with the receiving device 120, there is a possibility that a reservation cannot be normally registered in the recording device 130a.

In such a case, it is preferable that the timing at which the reservation instruction is transmitted from the receiving device 120 to the recording device 130a is not a time point immediately after the time when the receiving device 120 receives the mapping information having the extended program identifier that coincides with the extended program identifier in the reservation entry but the time point where a sufficient time period (e.g., one day) has elapsed since the receiving device 120 received the mapping information having the extended program identifier that coincides with the extended program identifier in the reservation entry. In the present embodiment, the reservation instruction is transmitted from the receiving device 120 to the recording device 130a at the time when the reserved program is started.

This ensures that sufficient information is stored in the recording device 130a when the reservation instruction is transmitted to the recording device 130a. As a result, it is possible to enhance the possibility that a reservation is normally registered in the recording device 130a. Here, the fact that a reservation is normally registered means that it is possible not only to obtain a correct program identifier but also refer to program attribute information such as a program title, accounting information, or a parental rate included in the newest program information.

Note that the timing at which the receiving device 120 transmits the reservation instruction to the recording device 130a may be before the time when a reserved program is started. At the time point where a predetermined time period has elapsed since the receiving device 120 received the mapping information having the extended program information identifier that coincides with the extended program identifier in the reservation entry, the receiving device 120 may transmit the reservation instruction to the recording device 130a. Alternatively, the receiving device 120 may transmit the reservation instruction to the recording device 130a a predetermined time period before or immediately before the time when the reserved program is started.

Furthermore, at the time point where a sufficient time period has elapsed since the recording device 130a received the reservation instruction, reservation registration processing may be performed. In this case, it is also possible to enhance the possibility that a reservation is normally registered in the recording device 130a.

The receiving device 120 may transmit to the recording device 130a an instruction to immediately start recording at the time when a reserved program is started.

FIG. 8 is a diagram showing an example of a reservation list window. The reservation list window is displayed on a presentation unit 128 by a UI processor 127 generating a graphics image using information stored in a reservation manager 124 and an extended reservation manager 125.

A reservation list window 610 has columns 611, 612, 613, and 614 on which a broadcasting station, a broadcasting date, a program title, and a state are respectively displayed for each reserved program.

Example of a state where a program is reserved include states where mapping information has not been received yet (states in the steps S501 to S313 shown in FIG. 7), states where transmission of a reservation instruction is waited for (states in the steps S314 to S502 shown in FIG. 7), states where a reservation instruction has already been transmitted (a state in the step S503 shown in FIG. 7), and a state where broadcasting is suspended.

In an example shown in FIG. 8, the reservation of a program 631 is in a state where a reservation instruction has already been transmitted, and the reservation of a program 632 is in a state where broadcasting is suspended. Programs 633 and 634 indicate that they constitute one program. Furthermore, the reservation of a program 635 is in a state where mapping information has not been received yet.

This reservation list window 610 allows a user to easily recognize a state where each of the programs is reserved.

(3) Third Embodiment

The configuration of a program reservation system according to a third embodiment of the present invention is the same as the configuration of the program reservation system shown in FIG. 6. Note that the recording device 130a shown in FIG. 6 may be replaced with the recording device 130 shown in FIG. 1.

However, the operation of a receiving device 120 in the program reservation system according to the present embodiment differs from the operation of the receiving device 120 shown in FIG. 6, and the operation of a recording device 130a in the program reservation system according to the present embodiment differs from the operation of the recording device 130 shown in FIG. 6, as described below.

Figure 9:
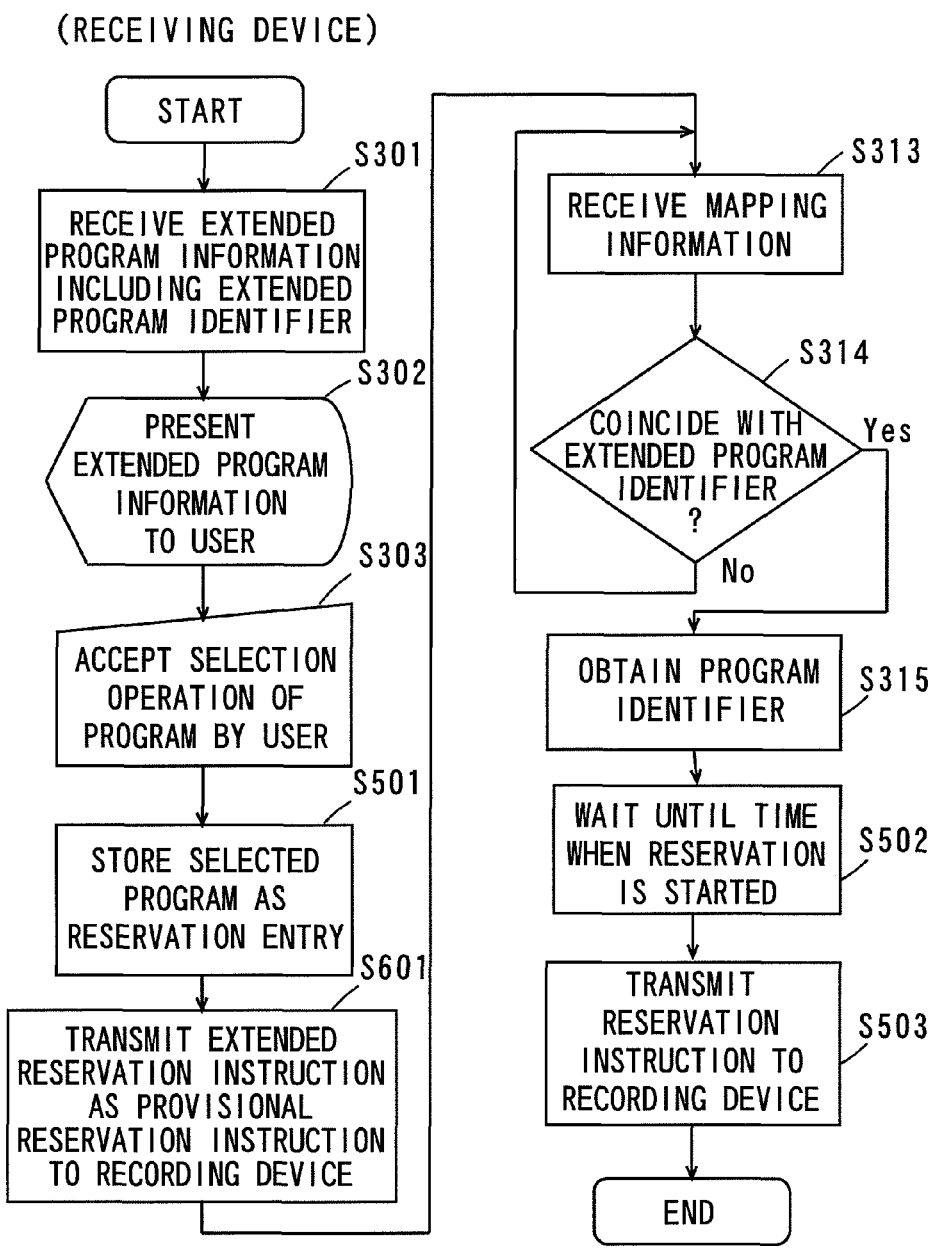
FIG. 9 is a flow chart showing reservation registration processing of a receiving device in a program reservation system according to a third embodiment of the present invention.

FIG. 9 is a flow chart showing reservation registration processing of the receiving device in the program reservation system according to the third embodiment of the present invention.

Processes in the steps S301 to S501 shown in FIG. 9 are the same as the processes in the steps S301 to S501 shown in FIG. 7.

An extended reservation manager 125 causes an instruction transmitter/receiver 126 to transmit an extended reservation instruction including a broadcasting date and a broadcasting station at the current time point as a provisional reservation instruction to the recording device 130a (step S601).

Processes in the steps S313 to S503 shown in FIG. 9 are the same as the processes in the steps S313 to S503 shown in FIG. 7.

As described in the foregoing, in the present embodiment, a reservation instruction is transmitted to the recording device 130a (step S503) at the time when a program is started after mapping information is received (step S502). Not only that, an extended reservation instruction for the same program is transmitted as a provisional reservation instruction to the recording device 130a (step S601) immediately after a user's operation for selecting the program is accepted (step S303).

Figure 10:
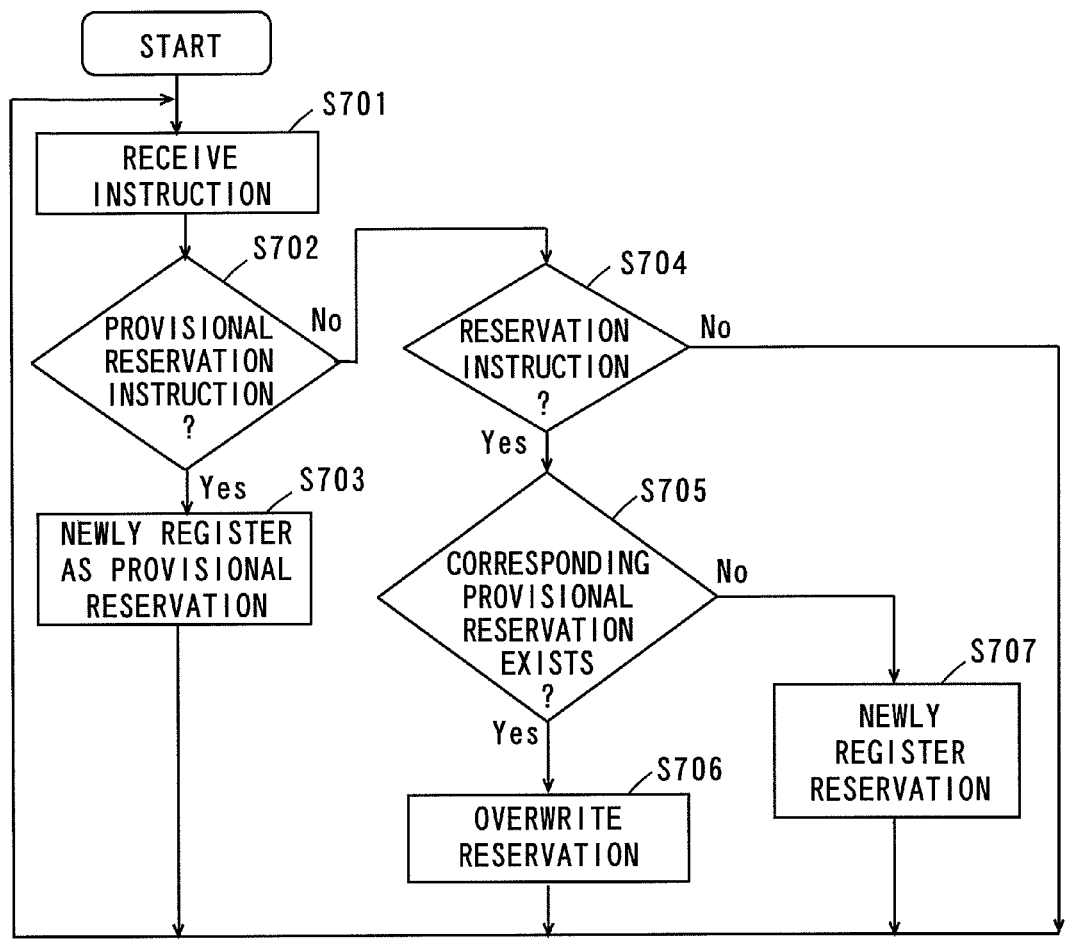
FIG. 10 is a flow chart showing reservation registration processing of a recording device in the program reservation system according to the third embodiment of the present invention.

FIG. 10 is a flow chart showing reservation registration processing of the recording device in the program reservation system according to the third embodiment of the present invention.

First, an instruction transmitter/receiver 131 receives an instruction (step S701). Then, a reservation executor 133 determines whether or not the instruction received in the step S701 is a provisional reservation instruction (step S702).

When the received instruction is the provisional reservation instruction, the reservation executor 133 newly registers the provisional reservation instruction as a provisional reservation (step S703). In this case, a reservation entry including an extended reservation instruction is registered in the reservation executor 133. Thereafter, the procedure is returned to the step S701.

When the received instruction is not the provisional reservation instruction, the reservation executor 133 determines whether or not the instruction received in the step S701 is a reservation instruction (step S704).

When the received instruction is the reservation instruction, the reservation executor 133 determines whether or not a provisional reservation corresponding to the reservation instruction has already been registered in the reservation executor 133 (step S705).

When the corresponding provisional reservation has already been registered in the reservation executor 133, the reservation executor 133 writes a reservation entry including the reservation instruction over a reservation entry including the registered provisional reservation (step S706). Thereafter, the procedure is returned to the step S701.

When the received instruction is not the reservation instruction in the step S704, the procedure is returned to the step S701.

Unless the corresponding provisional reservation has already been registered in the reservation executor 133 in the step S705, the reservation executor 133 newly registers a reservation based on the reservation instruction (step S707). Thereafter, the procedure is returned to the step S701.

As described in the foregoing, in the program reservation system according to the present embodiment, the existence of the reservation entry can be confirmed in the recording device 130a immediately after the user selects a program to be reserved. A noncompliant recording appliance allows the reservation entry to be updated to the newest content when information appended to a program, for example, a broadcasting date on which the program is broadcast, a broadcasting station at which the program is broadcast, or the title of the program.

Although in the present embodiment, the provisional reservation instruction based on the extended reservation instruction and a normal reservation instruction are distinguished in the step S702, processes in the step S705 and the subsequent steps may be always carried out without distinguishing the provisional reservation instruction and the normal reservation instruction. However, in this case, a provisional reservation and a normal reservation cannot be confirmed by a GUI or the like in the receiving device 120.

Figure 11:
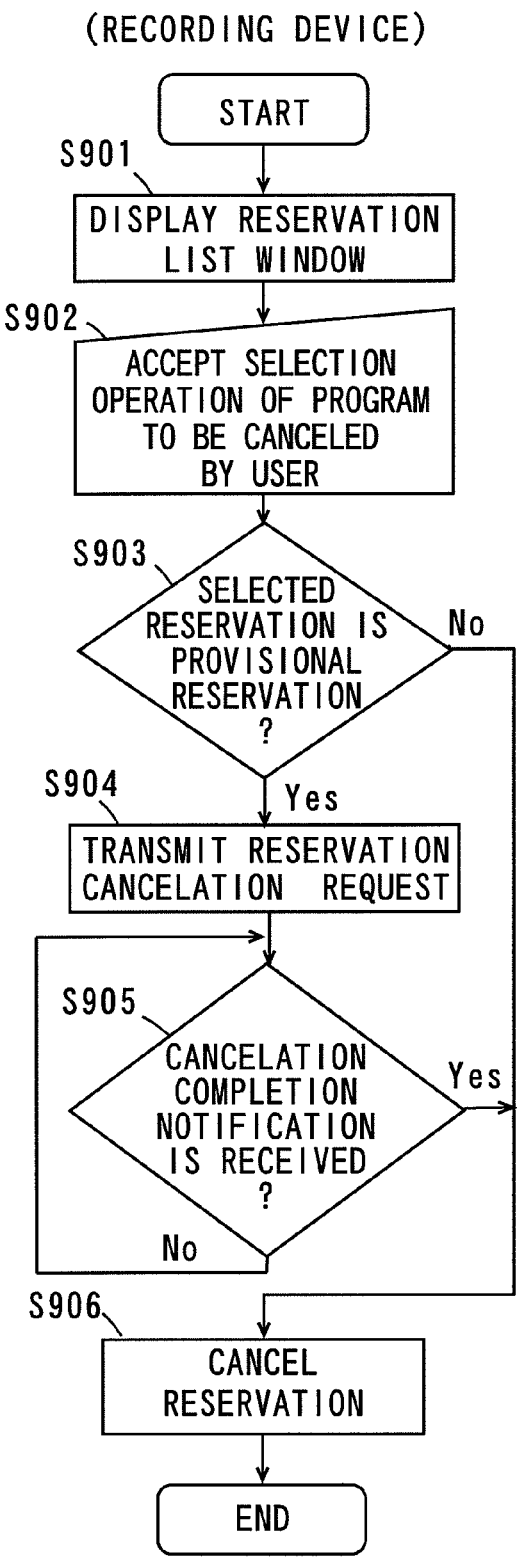
FIG. 11 is a flow chart showing reservation cancellation processing of a receiving device in the program reservation system according to the third embodiment of the present invention.

FIG. 11 is a flow chart showing reservation cancellation processing of the recording device in the program reservation system according to the third embodiment of the present invention.

First, the reservation executor 133 displays a reservation list window (step S901). On the reservation list window, a broadcasting station at which a reserved program is broadcast, a broadcasting date on which the program is broadcast, the title of the program, and determination as to whether or not the program is provisionally reserved are displayed. Here, the reservation executor 133 has the same function as the UI processor 127, the presentation unit 128, and the operation input unit 129 in the receiving device 120.

Then, the reservation executor 133 accepts a user's operation for selecting a program to be canceled (step S902). The user selects the program to be canceled from a list of reserved programs displayed in the step S901.

Then, the reservation executor 133 determines whether or not the selected reservation is a provisional reservation (step S903).

When the selected reservation is the provisional reservation, the reservation executor 133 causes the instruction transmitter/receiver 131 to transmit a reservation cancellation request (step S904). The reservation cancellation request is created using extended program information or program information.

Thereafter, the reservation executor 133 waits until the instruction transmitter/receiver 131 receives a cancellation completion notification (step S905).

When the instruction transmitter/receiver 131 receives the cancellation completion notification, the reservation executor 133 cancels a reservation entry relating to the selected program, to cancel the reservation (step S906).

When the reservation selected in the step S903 is not the provisional reservation, the reservation entry relating to the selected program is canceled, to cancel the reservation (step S906).

FIG. 12 is a flow chart showing reservation cancellation processing of the receiving device in the program reservation system according to the third embodiment of the present invention.

First, the instruction transmitter/receiver 126 receives a reservation cancellation request transmitted from the recording device 130a (step S921).

Then, the reservation manager 124 retrieves a reservation entry designated by the reservation cancellation request, and cancels the retrieved reservation entry to cancel the reservation (step S922).

Thereafter, the instruction transmitter/receiver 126 transmits a cancellation completion notification (step S923).

Thus, the user cancels the reservation in the recording device 130*a*, so that the reservation is also automatically canceled in the receiving device 120.

(4) Fourth Embodiment

The configuration of a program reservation system according to a fourth embodiment of the present invention is the same as the configuration of the program reservation system shown in FIG. 1 and the configuration of the program reservation system shown in FIG. 6.

However, the operation of a receiving device 120 in the program reservation system according to the present embodiment differs from the operation of the receiving device 120 shown in FIG. 1 or 6, and the operation of a recording device 130*a* in the program reservation system according to the present embodiment differs from the operation of the recording device 130 or 130*a* shown in FIG. 1 or 6, as described below.

Figure 13:
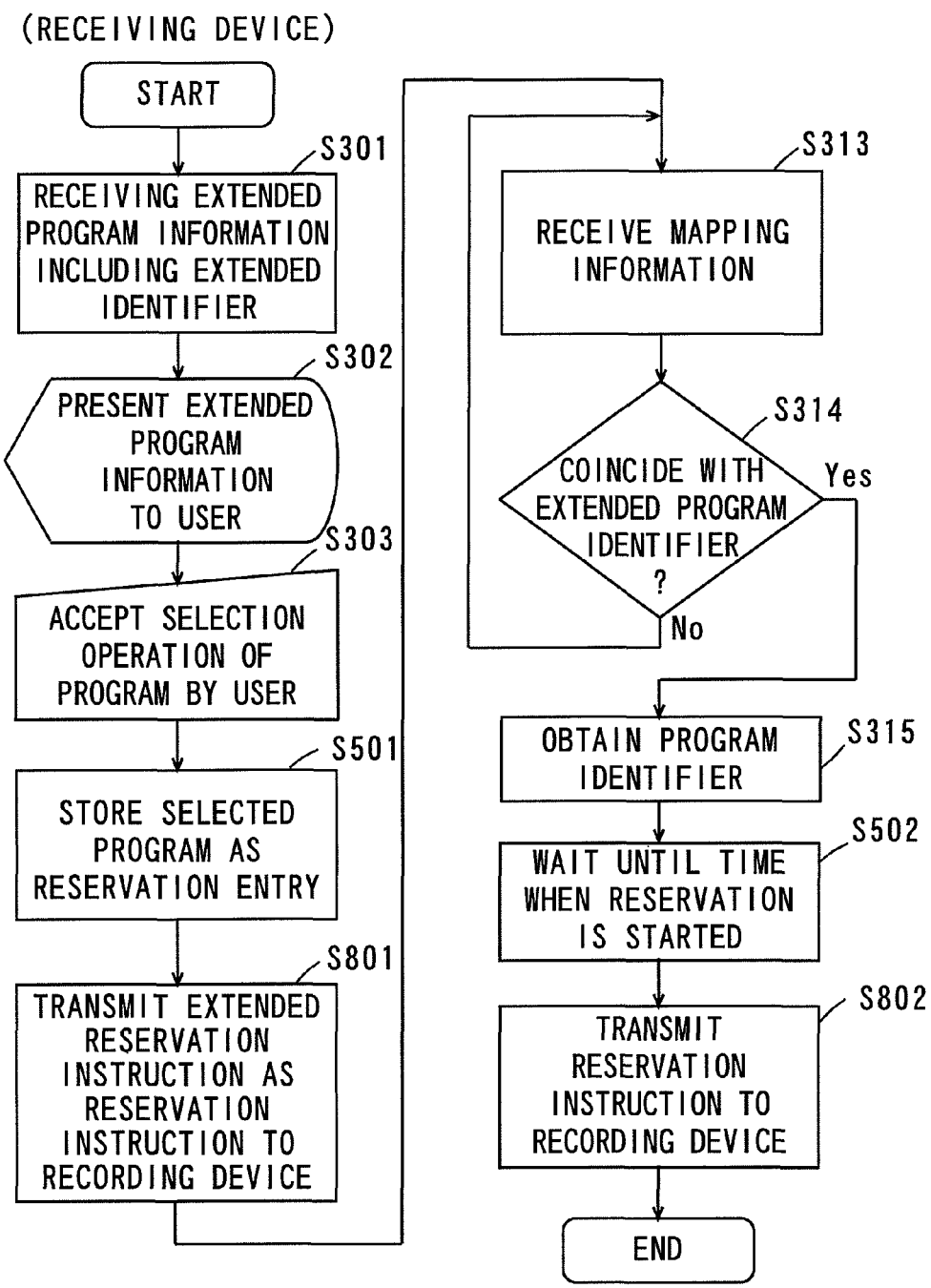
FIG. 13 is a flow chart showing reservation registration processing of a receiving device in a program reservation system according to a fourth embodiment of the present invention.

FIG. 13 is a flow chart showing reservation registration processing of the receiving device in the program reservation system according to the fourth embodiment of the present invention.

Processes in the steps S301 to S501 shown in FIG. 13 are the same as the processes in the steps S301 to S501 shown in FIG. 7.

An extended reservation manager 125 generates an extended reservation instruction on the basis of extended program information relating to a program selected in the step S501, and causes an instruction transmitter/receiver 126 to transmit the generated extended reservation instruction as a reservation instruction to the recording device 130*a* (step S801).

Processes in the steps S313 to S502 shown in FIG. 13 are the same as the processes in the steps S313 to S502 shown in FIG. 7.

At the time when the reserved program is started, the extended reservation manager 125 generates a reservation instruction using a program identifier obtained in the step S315, and causes the instruction transmitter/receiver 126 to transmit the generated reservation instruction to the recording device (step S802).

When a user thus performs a program reservation operation once, the extended reservation instruction is transmitted as a reservation instruction to the recording device 130*a* at the time point where the user selects a program to be reserved (step S801), and the reservation instruction is transmitted to the recording device 130*a* again at the time point where an extended program identifier in mapping information coincides with an extended program identifier corresponding to the extended reservation instruction (step S802).

Figure 14:
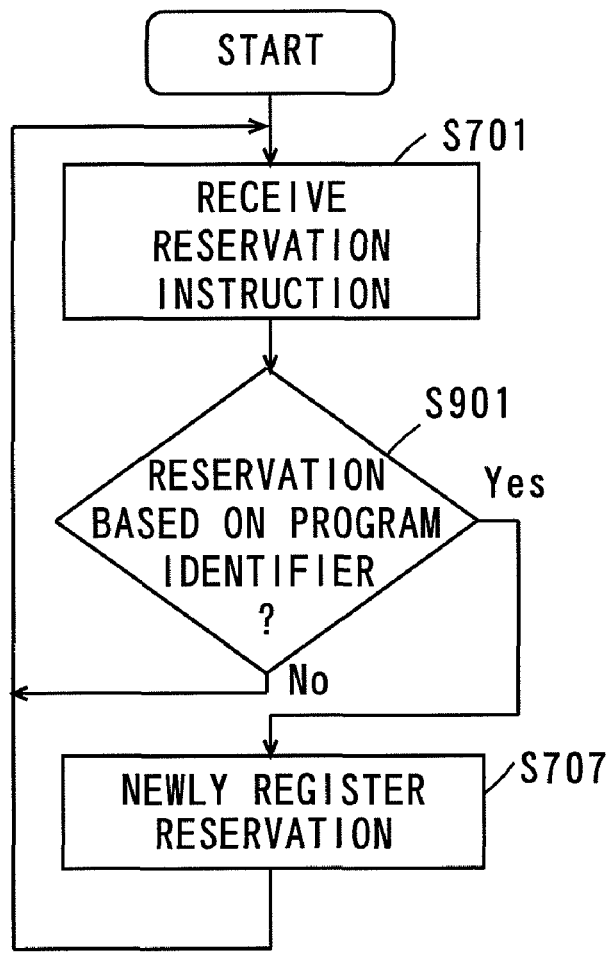
FIG. 14 is a flow chart showing reservation registration processing of a recording device in the program reservation system according to the fourth embodiment of the present invention.

FIG. 14 is a flow chart showing reservation registration processing of the recording device in the program reservation system according to the fourth embodiment of the present invention. Here, the program reservation system according to the present embodiment shall include the recording device 130*a* shown in FIG. 6. The recording device 130*a* is a non-compliant recording appliance.

First, an instruction transmitter/receiver 131 receives a reservation instruction (step S701). Then, a reservation executor 133 determines whether or not the instruction received in the step S701 is a reservation instruction based on a program identifier (step S901).

When the received instruction is the reservation instruction based on the program identifier, the reservation executor 133 newly registers the reservation instruction (step S707). In this case, a reservation entry including the reservation instruction is registered in the reservation executor 133. Thereafter, the procedure is returned to the step S701.

That is, although in the recording device 130*a*, a reservation instruction based on an extended reservation instruction transmitted from the receiving device 120 in the step S801 shown in FIG. 13 is ignored, a reservation based on a reservation instruction transmitted from the receiving device 120 in the step S802 is registered.

On the other hand, the recording device 130 shown in FIG. 1 can be also connected to the receiving device 120 in the program reservation system according to the present embodiment. In this case, in the recording device 130, a program identifier based on mapping information is acquired on the basis of the reservation instruction transmitted from the receiving device 120 in the step S801 shown in FIG. 13, and a reservation is registered on the basis of the acquired program identifier. On the other hand, when the reservation instruction based on the program identifier transmitted from the receiving device 120 in the step S802 is received, the extended reservation executor 133 may ignore the reservation instruction. Alternatively, a reservation entry generated by the reservation instruction based on the program identifier may be written over the reservation entry already stored. As a result, the reservation is similarly executed.

As described in the foregoing, in the program reservation system according to the present embodiment, the receiving device 120 can transmit the extended reservation instruction and the reservation instruction without considering whether or not the recording device is adapted to extended program information. In this case, the reservation is normally registered irrespective of whether or not the recording device is adapted to the extended program information.

(5) Fifth Embodiment

The configuration of a program reservation system according to a fifth embodiment of the present invention is the same as the configuration of the program reservation system shown in FIG. 1 or the configuration of the program reservation system shown in FIG. 6.

However, the operation of a receiving device 120 in the program reservation system according to the present embodiment differs from the operation of the receiving device 120 shown in FIG. 1 or 6, and the operation of a recording device 130*a* in the program reservation system according to the present embodiment differs from the operation of the recording device 130 or 130*a* shown in FIG. 1 or 6, as described below.

Figure 15:
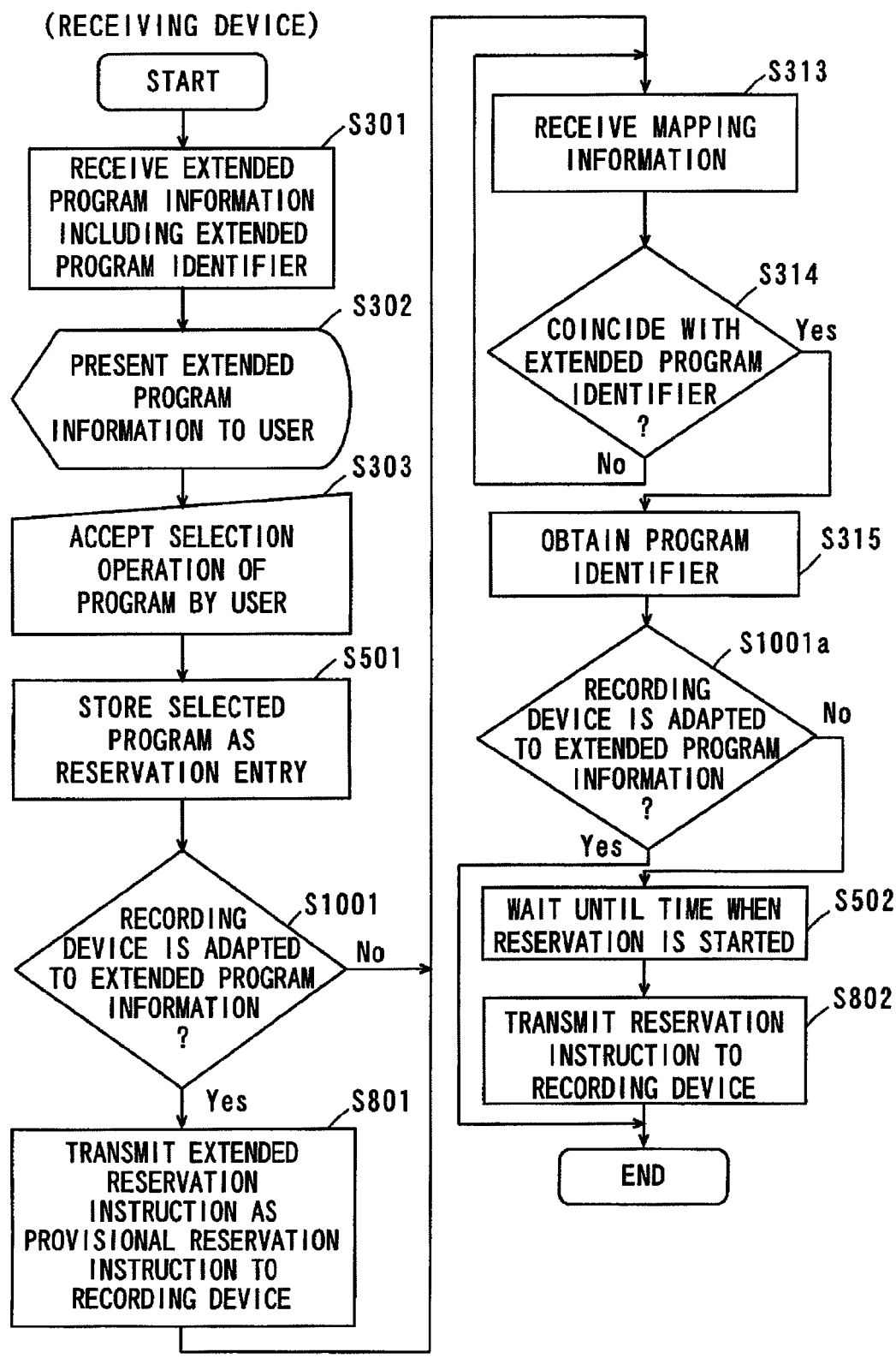
FIG. 15 is a flow chart showing reservation registration processing of a receiving device in a program reservation system according to a fifth embodiment of the present invention.

FIG. 15 is a flow chart showing reservation registration processing of the receiving device in the program reservation system according to the fifth embodiment of the present invention.

The reservation registration processing shown in FIG. 15 differs from the reservation registration processing shown in FIG. 13 in that a process in the step S1001 and a process in the step S1001*a* are added.

In the step S1001, an extended reservation manager 125 determines whether or not the recording device is adapted to extended program information.

In this case, the extended reservation manager 125 inquires of an extended reservation executor 132 via an instruction transmitter/receiver 126 and the instruction transmitter/receiver 131 in the recording device 130 shown in FIG. 1, or inquires of a reservation executor 133 via an instruction transmitter/receiver 126 and the instruction transmitter/receiver 131 in the recording device 130*a* shown in FIG. 6.

The extended reservation executor 132 in the recording device 130 shown in FIG. 1 transmits information indicating that the recording device 130 is adapted to the extended program information in response to an inquiry from the receiving device 120 to the extended reservation manager 125 via the instruction transmitter/receiver 131 and the instruction transmitter/receiver 126 in the receiving device 120. The reservation executor 133 in the recording device 130*a* shown in FIG. 6 transmits information indicating that the recording device 130*a* is not adapted to the extended program information in response to an inquiry from the receiving device 120 to the extended reservation manager 125 via the instruction transmitter/receiver 131 and the instruction transmitter/receiver 126 in the receiving device 120. This allows the extended reservation manager 125 in the receiving device 120 to determine whether or not the recording device is adapted to the extended program information.

Alternatively, the extended reservation manager 125 can determine that the recording device is not adapted to the extended program information even when the recording device does not respond to the inquiry from the receiving device 120.

The procedure proceeds to the step S801 when the recording device is adapted to the extended program information, while proceeding to the step S313 when the recording device is not adapted to the extended program information.

In the step S1001*a*, the extended reservation manager 125 determines whether or not the recording device is adapted to the extended program information, as in the step S1001.

When the recording device is adapted to the extended program information, the processing is terminated. When the recording device is not adapted to the extended program information, the procedure proceeds to the step S502.

As described in the foregoing, in the program reservation system according to the present embodiment, when the recording device is adapted to the extended program information, an extended reservation instruction is transmitted to the recording device at the time point where a user selects a program to be reserved (step S801). On the other hand, when the recording device is not adapted to the extended program information, a reservation instruction is transmitted to the recording device at the time point where an extended program identifier in mapping information coincides with an extended program identifier corresponding to the extended reservation instruction (step S802).

Since a protocol for reservation is thus automatically selected depending on the results of determination whether or not the recording device is adapted to the extended program information, the user can register the reservation without being conscious of whether or not the recording device connected to the receiving device 120 is adapted to the extended reservation instruction.

Although in the present embodiment, the processes in the steps S51001 and S1001*a* are determined by communication with the recording device, the user can make a setting in advance as to whether or not the recording device is adapted to the extended program information. Alternatively, it may be determined whether or not the recording device is adapted to the extended program information when it is connected, and the reservation manager 124 may maintain the results of the determination. Thus, communication for determining whether or not the recording device is adapted to the extended program information is not established for each user's reservation operation.

Although in the present embodiment, it is determined whether or not the recording device is adapted to the extended program information (step S1001) before the extended reservation instruction is transmitted (step S801), it is determined whether or not the recording device is adapted to the extended program information depending on whether or not an error occurs when the extended reservation instruction is transmitted. That is, the receiving device 120 transmits the extended reservation instruction in the step S801 at least once to the recording device without making the determination in the step S1001. When the error is returned to the extended reservation instruction as an instruction that cannot be treated by the recording device, the receiving device 120 can determine that the recording device is not adapted to the extended program information.

Conversely, the recording device that is adapted to the extended program information may return any error to the reservation instruction based on the program identifier. In this case, the receiving device 120 can determine that the recording device is adapted to the extended program information.

(6) Sixth Embodiment

Figure 16:
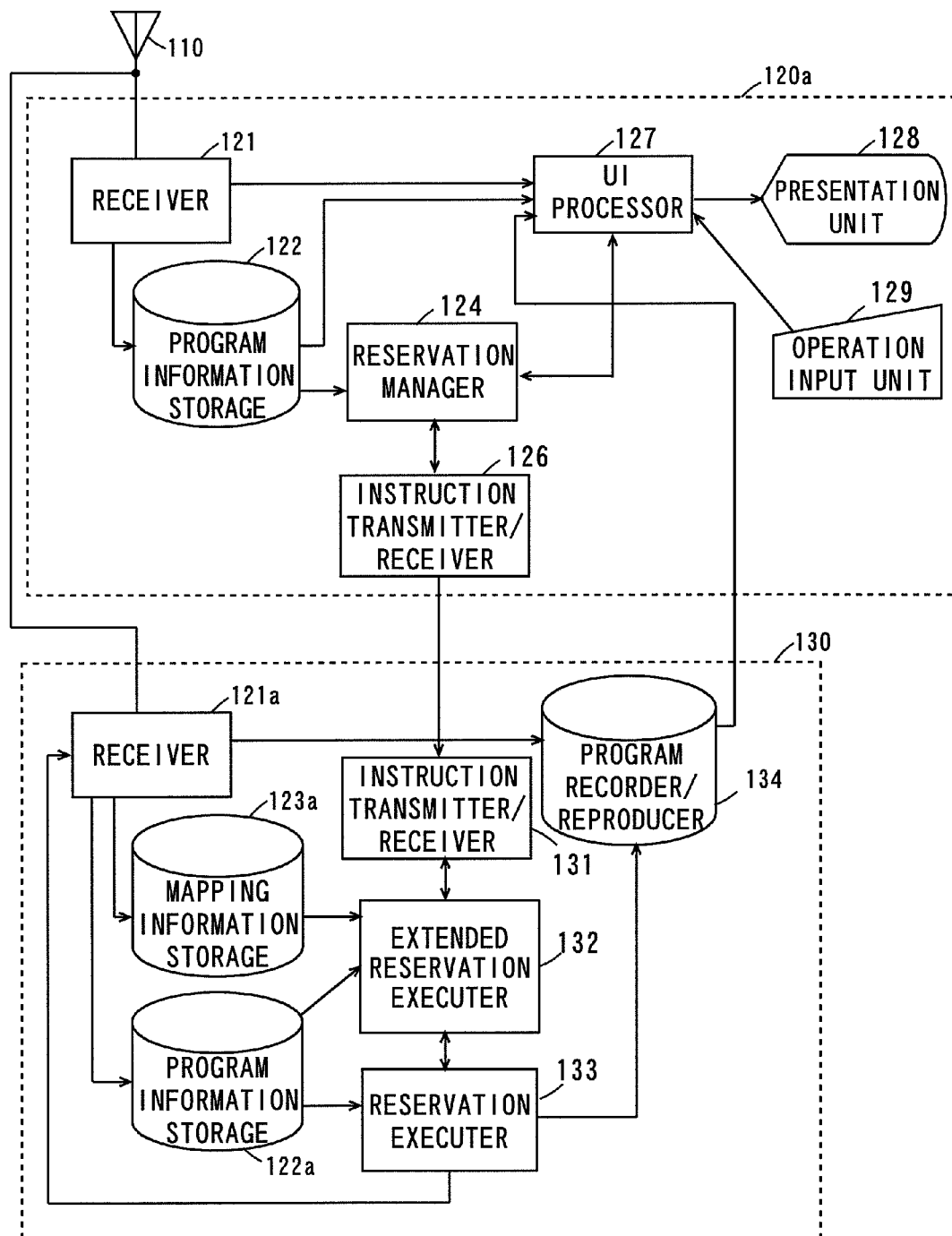
FIG. 16 is a block diagram showing the configuration of a program reservation system according to a sixth embodiment of the present invention.

FIG. 16 is a block diagram showing the configuration of a program reservation system according to a sixth embodiment of the invention.

The configuration of a recording device 130 shown in FIG. 16 is the same as the configuration of the receiving device 130 shown in FIG. 1. However, the operation of the recording device 130 shown in FIG. 16 differs from the operation of the recording device 130 shown in FIG. 1, as described below.

Furthermore, a receiving device 120*a* shown in FIG. 16 differs in configuration from the receiving device 120 shown in FIG. 1 in that it does not include a mapping information storage 123 and an extended reservation manager 125.

Figure 17:
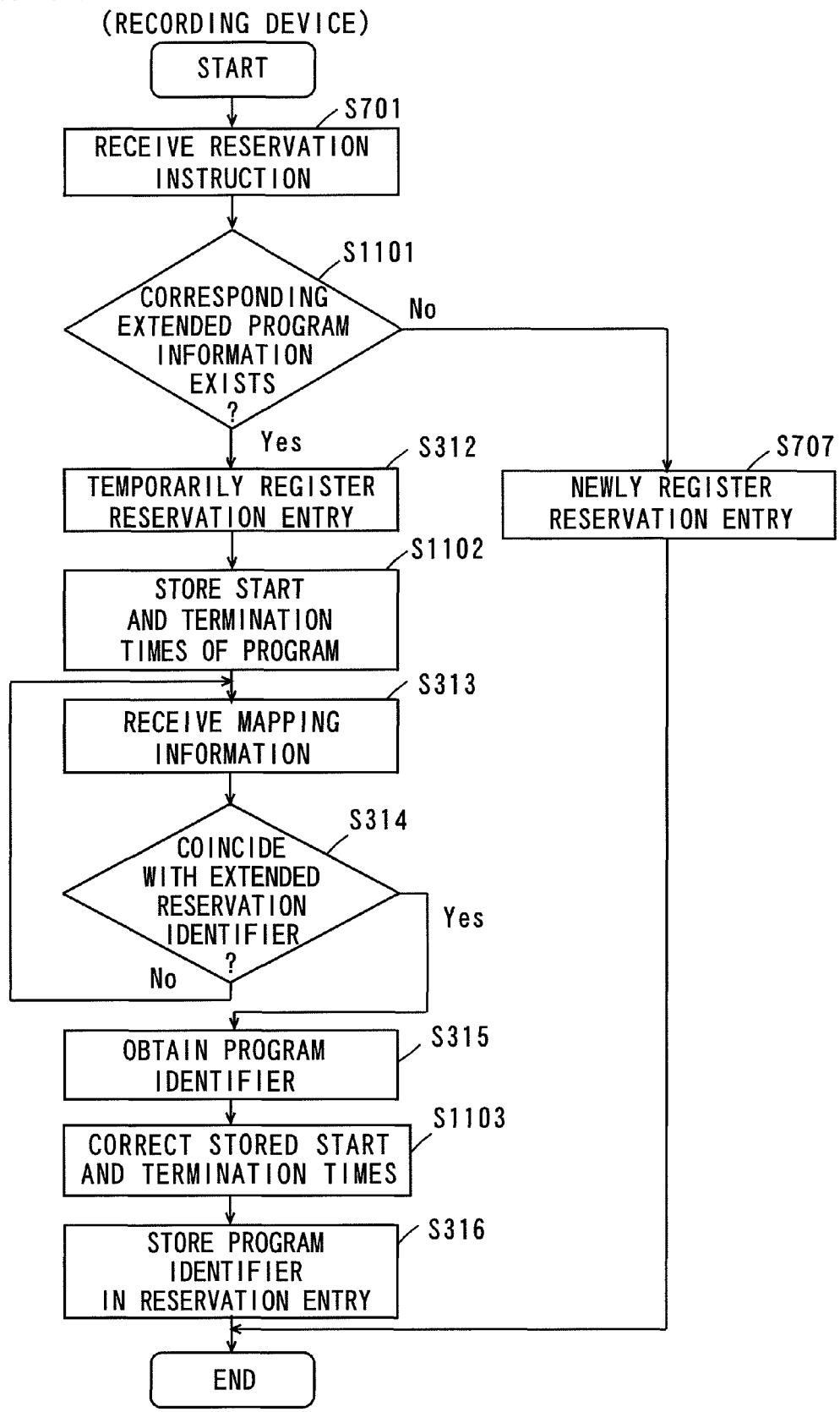
FIG. 17 is a flow chart showing reservation registration processing of a recording device in the program reservation system according to the sixth embodiment of the present invention.

FIG. 17 is a flow chart showing reservation registration processing of the recording device in the program reservation system according to the sixth embodiment of the present invention. FIG. 18 is a schematic view showing an example of reservation registration processing of the recording device in the program reservation system according to the sixth embodiment of the present invention.

Processes in the steps S312, S313 to S315, and S316 shown in FIG. 17 are the same as the processes in the steps S312, S313 to S315, and S316 shown in FIG. 5.

First, an instruction transmitter/receiver 131 receives a reservation instruction (step S701). Then, an extended reservation executor 132 searches a program information storage 122*a* with a broadcasting date and a broadcasting station that are included in the reservation instruction used as retrieval conditions, and determines whether or not there exists extended program information that coincides with the reservation instruction in the broadcasting date and the broadcasting station (step S1101).

When there exists extended program information that coincides with the reservation instruction in the broadcasting date and the broadcasting station, the procedure proceeds to the step S312. When there exists no extended program information that coincides with the reservation instruction in the broadcasting date and the broadcasting station, the procedure proceeds to the step S707.

In the step S707, a reservation executor 133 newly registers a reservation based on the reservation instruction. Thereafter, the processing is terminated.

In the present embodiment, the step S1102 is added between the steps S321 and S313, and the step S1103 is added between the steps S315 and S316.

In the step S1102, the extended reservation executor 132 stores the start and termination times of a program that are obtained from the extended program information.

In the step S1103, the extended reservation executor 132 corrects the start and termination times of the program.

For example, the reservation instruction shall include the start time 20:30 and the termination time 21:30 of the program, as shown in FIG. 18. In the step S1102, the start time 20:30 and the termination time 21:30 are stored. A time period from the start time to the termination time is overlapped with both time periods during which two programs P1 and P2 are respectively broadcast. Extended program information EID1 and EID2 are retrieved on the basis of the start time and the termination time. The start time of the program P1 corresponding to the extended program information EID1 is 20:20, and the termination time of the program P2 corresponding to the extended program information EID2 is 22:00.

Here, the difference between the start time of the program in the reservation instruction and the start time of the program in the extended program information is referred to as start offset, and the difference between the termination time of the program in the reservation instruction and the termination time of the program in the extended program information is referred to as termination offset.

In the example shown in FIG. 18, start offset OF1 is +10 (plus 10 minutes), and termination offset OF2 is −30 (minus 30 minutes).

Then, program identifiers respectively corresponding to the extended program information EID1 and EID2 are obtained on the basis of mapping information, and program information ID1 and ID2 respectively corresponding to the program identifiers are acquired. It is found that the start time of the program P1 and the termination time of the program P2 are respectively changed into 20:30 and 21:50 on the basis of the program information ID1 and ID2.

The start offset is added to the start time after the change of the program P1, and the termination offset OF2 is added to the termination time after the change of the program P2, so that the start and termination times that are stored in the step S1102 are corrected.

In the example shown in FIG. 18, the start time is corrected to 20:40 on the basis of the start offset OF1, and the termination time is corrected to 21:20 on the basis of the termination offset OF2.

Thus, in the program reservation system according to the present embodiment, the program reservation based on the extended program information can be normally registered even when the receiving device 120*a* that is not adapted to the extended program information is connected to the recording device 130.

(7) Effects of Embodiments

The program reservation systems according to the above-mentioned embodiments make it possible to realize, for a program after an elapse of a predetermined time period during which programming information is transmitted, a reservation with the program identified, similarly to a reservation using program information.

That is, even when a date on which a program is broadcast is changed into another date immediately before the broadcasting or when a channel at which the program is broadcast is changed into another channel during the program (an event relay), the reserved date or channel can be caused to follow the date or the channel after the change. Furthermore, it is possible to display a program title on a list of reservations currently registered or display the program title as a fine name of a file storing a recorded program.

Furthermore, there is a case where a receiving device or a recording device that was purchased in the past is mixed in the current program reservation system or a case where a functional difference or the like on a commodity lineup occurs. In such situations, there occurs a case where a receiving device that is adapted to extended program identifier and a recording device that is adapted to the extended program identifier are connected to each other, a case where a receiving device that is adapted to the extended program identifier and a recording device that is not adapted to the extended program identifier are connected to each other, or a case where a receiving device that is not adapted to the extended program identifier and a recording device that is adapted to the extended program identifier are connected to each other. In such different connection forms, a user can reserve a program using extended program information or program information reliably and simply without being conscious of whether or not each of the receiving device and the recording device is adapted to the extended program information.

Furthermore, a protocol for program reservation is unified irrespective of the connection form. Even if the connection form is erroneously determined, therefore, the reservation can be reliably executed.

(8) Correspondences between elements in the claims and parts in embodiments

In the following paragraphs, non-limiting examples of correspondences between various elements recited in the claims below and those described above with respect to various preferred embodiments of the present invention are explained.

In the first embodiment, the receiving device 120 is an example of a reservation instruction device, and the recording device 130 is an example of a reservation execution device. The receiver 121 is an example of a first receiver, the operation input unit 129 is an example of a selector, and the instruction transmitter/receiver 126 is an example of a transmitter. Furthermore, the receiver 121*a* and the instruction transmitter/receiver 131 are examples of a second receiver, the extended reservation executor 132 is an example of a first acquirer, a second acquirer, and a storage, and the program recorder/reproducer 134 is an example of a recorder/reproducer.

In the second embodiment, the receiving device 120 is an example of a reservation instruction device, and the recording devices 130 and 130*a* are examples of a reservation execution device. The receiver 121 is an example of a first receiver, the operation input unit 129 is an example of a selector, and the extended reservation manager 125 is an example of an acquirer, the instruction transmitter/receiver 126 is an example of a transmitter, and the presentation unit 128 is an example of a presentation unit. Furthermore, the receiver 121*a* and the instruction transmitter/receivers 131 are examples of a second receiver, the reservation executor 133 is an example of a storage, and the program recorder/reproducer 134 is an example of a recorder/reproducer.

In the second embodiment, the receiving device 120 is an example of a reservation instruction device, and the recording devices 130 and 130*a* are examples of a reservation execution device. The receiver 121 is an example of a first receiver, the operation input unit 129 is an example of a selector, the extended reservation manager 125 is an example of an acquirer, the instruction transmitter/receiver 126 is an example of a transmitter, and the presentation unit 128 is an example of a presentation unit. Furthermore, the receiver 121*a* and the instruction transmitter/receivers 131 are examples of a second receiver, the reservation executor 133 is an example of a storage, and the program recorder/reproducer 134 is an example of a recorder/reproducer.

In the third embodiment, the receiving device 120 is an example of a reservation instruction device, and the recording devices 130 and 130a are examples of a reservation execution device. The receiver 121 is an example of a first receiver, the operation input unit 129 is an example of a selector, the extended reservation manager 125 is an example of a first acquirer, the instruction transmitter/receiver 126 is an example of a transmitter, and the presentation unit 128 is an example of a presentation unit. Furthermore, the receiver 121a and the instruction transmitter/receiver 131 are examples of a second receiver, the reservation executor 133 is an example of a second acquirer and a storage, and the program recorder/reproducer 134 is an example of a recorder/reproducer. The reservation executor 133 is an example of a canceller.

In the fourth embodiment, the receiving device 120 is an example of a reservation instruction device, and the recording devices 130 and 130a are examples of a reservation execution device. The receiver 121 is an example of a first receiver, the operation input unit 129 is an example of a selector, the extended reservation manager 125 is an example of a first acquirer, and the instruction transmitter/receiver 126 is an example of a transmitter. Furthermore, the receiver 121a and the instruction transmitter/receiver 131 are examples of a second receiver, the reservation executor 133 is an example of a storage, and the program recorder/reproducer 134 is an example of a recorder/reproducer.

In the fifth embodiment, the receiving device 120 is an example of a reservation instruction device, and the recording devices 130 and 130a are examples of a reservation execution device. The receiver 121 is an example of a first receiver, the operation input unit 129 is an example of a selector, the extended reservation manager 125 is an example of a first acquirer, and the instruction transmitter/receiver 126 is an example of a transmitter. Furthermore, the receiver 121a and the instruction transmitter/receiver 131 are examples of a second receiver, the reservation executor 133 is an example of a storage, and the program recorder/reproducer 134 is an example of a recorder/reproducer. The extended reservation manager 125 is an example of a determiner.

In the sixth embodiment, the receiving devices 120 and 120a are examples of a reservation instruction device, and the recording device 130 is an example of a reservation execution device. The receiver 121 is an example of a first receiver, the operation input unit 129 is an example of a selector, and the instruction transmitter/receiver 126 is an example of a transmitter. Furthermore, the receiver 121a and the instruction transmitter/receiver 131 are examples of a second receiver, the extended reservation executor 132 is an example of a first acquirer, a second acquirer, and a storage, and the program recorder/reproducer 134 is an example of a recorder/reproducer.

INDUSTRIAL APPLICABILITY

The present invention is applicable to a program reservation system including a recording/reproducing appliance or the like that is adapted to delivery in general of a video program and/or a music program in broadcasting or communication because a program after an elapse of a predetermined time period during which programming information is transmitted can be reserved with the program identified.

The invention claimed is:

1. A program reservation system that receives program data transmitted from a broadcasting station, program information including a program identifier for identifying a program, extended program information including an extended program identifier for identifying said program before said program identifier is transmitted, and mapping information representing a correspondence between said extended program identifier and said program identifier, comprising:
a reservation instruction device that gives an instruction to reserve a program; and
a reservation execution device that executes a reservation based on said instruction given by said reservation instruction device,
wherein said reservation instruction device includes
a first receiver that receives said extended program information,
a selector for selecting a program to be reserved on the basis of the extended program information received by said first receiver, and
a transmitter that transmits an extended reservation instruction based on an extended program identifier for identifying the program selected by said selector, and
said reservation execution device includes
a second receiver that receives said program data, said mapping information, said program information, and the extended reservation instruction transmitted from said reservation instruction device,
a first acquirer that acquires an extended program identifier from the extended reservation instruction received by said second receiver,
a second acquirer that acquires a program identifier corresponding to the extended program identifier acquired by said first acquirer on the basis of the mapping information received by said second receiver,
a storage that stores a program reservation on the basis of the program identifier acquired by said second acquirer, and
a recorder/reproducer that records and/or reproduces the program data received by said second receiver in accordance with the program reservation stored in said storage, and
wherein said extended program identifier is assigned to said program before a time point where said program identifier is assigned to said program, and said mapping information is transmitted after the time point where said program identifier is assigned to said program.

2. The program reservation system according to claim 1, wherein said reservation instruction device can communicate with a recording/reproducing appliance that is not adapted to said extended program information and receives a reservation instruction based on said program identifier in order to reserve a program, and said extended reservation instruction includes a broadcasting station at which and a broadcasting time period during which the program is broadcast while including predetermined information at a position ignored by said recording/reproducing appliance.

3. The program reservation system according to claim 2, wherein said extended reservation instruction has a configuration in which predetermined information is further added to the configuration of said reservation instruction.

4. The program reservation system according to claim 1, wherein said extended reservation instruction includes the broadcasting station at which the program is broadcast while having an invalid value as a program identifier.

5. A program reservation system that receives program data transmitted from a broadcasting station, program information including a program identifier for identifying a program, extended program information including an extended program identifier for identifying said program before said program identifier is transmitted, and mapping information representing a correspondence between said extended program identifier and said program identifier, comprising:
  a reservation instruction device that gives an instruction to reserve a program; and
  a reservation execution device that executes a reservation based on said instruction given by said reservation instruction device,
  wherein said reservation instruction device includes
  a first receiver that receives said extended program information, said program information, and said mapping information,
  a selector for selecting a program to be reserved on the basis of the extended program information received by said first receiver, and
  an acquirer that acquires a program identifier corresponding to the extended program identifier for identifying the program selected by said selector on the basis of the mapping information received by said first receiver,
  a transmitter that transmits a reservation instruction based on the program identifier acquired by said acquirer, and
  a presentation unit that presents situations where said program identifier based on said mapping information is acquired for the reservation of the program selected by said selector, and
  said reservation execution device includes
  a second receiver that receives said program data and the reservation instruction transmitted from said reservation instruction device,
  a storage that stores a program reservation on the basis of the reservation instruction received by said second receiver, and
  a recorder/reproducer that records and/or reproduces the program data received by said second receiver in accordance with the program reservation stored in said storage, and
  wherein said extended program identifier is assigned to said program before a time point where said program identifier is assigned to said program, and said mapping information is transmitted after the time point where said program identifier is assigned to said program.

6. The program reservation system according to claim 5, wherein the situations where said program identifier based on said mapping information is acquired include a state where the acquisition of said program identifier based on said mapping information is waited for.

7. The program reservation system according to claim 5, wherein said transmitter transmits said reservation instruction after an elapse of not less than a predetermined time period since said acquirer acquired the program identifier.

8. A program reservation system that receives program data transmitted from a broadcasting station, program information including a program identifier for identifying a program, extended program information including an extended program identifier for identifying said program before said program identifier is transmitted, and mapping information representing a correspondence between said extended program identifier and said program identifier, comprising:
  a reservation instruction device that gives an instruction to reserve a program; and
  a reservation execution device that executes a reservation based on said instruction given by said reservation instruction device,
  wherein said reservation instruction device includes
  a first receiver that receives said extended program information, said program information, and said mapping information,
  a selector for selecting a program to be reserved on the basis of the extended program information received by said first receiver, and
  a first acquirer that acquires a program identifier corresponding to the extended program identifier for identifying the program selected by said selector on the basis of the mapping information received by said first receiver, and
  a transmitter that transmits an extended reservation instruction based on the extended program identifier in order to reserve the program selected by said selector, and then transmits a reservation instruction based on the program identifier acquired by said first acquirer, and
  said reservation execution device includes
  a second receiver that receives said program data and the extended reservation instruction and the reservation instruction that are transmitted from said reservation instruction device,
  a second acquirer that acquires the extended program identifier on the basis of the extended reservation instruction received by said second receiver and acquires the program identifier on the basis of the reservation instruction received by said second receiver,
  a storage that stores as a provisional reservation a program reservation based on the extended program identifier acquired by said second acquirer when said second receiver receives the extended reservation instruction, and stores a program reservation based on the program identifier acquired by said second acquirer when said second receiver receives the reservation instruction,
  a recorder/reproducer that records and/or reproduces the program data received by said second receiver in accordance with the program reservation stored in said storage, and
  a presentation unit that makes a presentation as to whether or not the program reservation stored in said storage is the provisional reservation, and
  wherein said extended program identifier is assigned to said program before a time point where said program identifier is assigned to said program, and said mapping information is transmitted after the time point where said program identifier is assigned to said program.

9. The program reservation system according to claim 8, wherein said storage writes the program reservation based on said program identifier over the program reservation based on said extended program identifier when said second receiver receives the reservation instruction.

10. The program reservation system according to claim 8, wherein
  said reservation execution device further includes
  a canceller that selects a program to be canceled and cancels a program reservation corresponding to the selected program from said storage while transmitting a request to cancel the selected program to said reservation instruction device.

11. The program reservation system according to claim 8, wherein said reservation instruction device further includes a presentation unit that presents situations where said program identifier based on said mapping information is acquired for the reservation of the program selected by said selector.

12. A program reservation system that receives program data transmitted from a broadcasting station, program information including a program identifier for identifying a program, extended program information including an extended program identifier for identifying said program before said program identifier is transmitted, and mapping information representing a correspondence between said extended program identifier and said program identifier, comprising:

a reservation instruction device that gives an instruction to reserve a program; and
a reservation execution device that executes a reservation based on said instruction given by said reservation instruction device,
wherein said reservation instruction device includes
a first receiver that receives said extended program information and said mapping information,
a selector for selecting a program to be reserved on the basis of the extended program information received by said first receiver, and
a first acquirer that acquires a program identifier corresponding to the extended program identifier for identifying the program selected by said selector on the basis of the mapping information received by said first receiver, and
a transmitter that transmits an extended reservation instruction based on the extended program identifier for identifying the program selected by said selector, and then transmits a reservation instruction based on the program identifier acquired by said first acquirer, and
said reservation execution device includes
a second receiver that receives said program data and the extended reservation instruction or the reservation instruction that is transmitted from said reservation instruction device,
a storage that stores a program reservation on the basis of the extended reservation instruction or the reservation instruction received by said second receiver, and
a recorder/reproducer that records and/or reproduces the program data received by said second receiver in accordance with the program reservation stored in said storage, and
wherein said extended program identifier is assigned to said program before a time point where said program identifier is assigned to said program, and said mapping information is transmitted after the time point where said program identifier is assigned to said program.

13. The program reservation system according to claim 12, wherein
said reservation instruction device includes
a determiner that determines whether or not said reservation execution device is adapted to the extended reservation instruction based on said extended program identifier, and
said transmitter transmits the extended reservation instruction based on the extended program identifier for identifying the program selected by said selector, and then transmits the reservation instruction on the basis of the program identifier acquired by said first acquirer when said determiner determines that said reservation execution device is adapted to said extended program identifier, while transmitting the reservation instruction on the basis of the program identifier acquired by said first acquirer when said determiner determines that said reservation execution device is not adapted to said extended program identifier.

14. A program reservation system that receives program data transmitted from a broadcasting station, program information including a program identifier for identifying a program, extended program information including an extended program identifier for identifying said program before said program identifier is transmitted, and mapping information representing a correspondence between said extended program identifier and said program identifier, comprising:

a reservation instruction device that gives an instruction to reserve a program; and
a reservation execution device that executes a reservation based on said instruction given by said reservation instruction device,
wherein said reservation instruction device includes
a first receiver that receives said program information,
a selector for selecting a program to be reserved on the basis of the program information received by said first receiver, and
a transmitter that transmits a reservation instruction in order to reserve the program selected by said selector, and
said reservation execution device includes
a second receiver that receives said program data, said extended program information, said mapping information, said program information, and the reservation instruction transmitted from said reservation instruction device,
a first acquirer that acquires an extended program identifier from the reservation instruction received by said second receiver,
a second acquirer that acquires, when said first acquirer acquires the extended program identifier, a program identifier corresponding to the extended program identifier acquired by said first acquirer on the basis of the mapping information received by said second receiver, while acquiring, when said first acquirer does not acquire the extended program identifier, a program identifier from the reservation instruction received by said second receiver,
a storage that stores a program reservation on the basis of the program identifier acquired by said second acquirer, and
a recorder/reproducer that records and/or reproduces the program data received by said second receiver in accordance with the program reservation stored in said storage, and
wherein said extended program identifier is assigned to said program before a time point where said program identifier is assigned to said program, and said mapping information is transmitted after the time point where said program identifier is assigned to said program.

* * * * *